US010591682B1

(12) United States Patent
Grandidge

(10) Patent No.: US 10,591,682 B1
(45) Date of Patent: Mar. 17, 2020

(54) DETACHABLE BEZEL FOR CASSETTE MOUNTING

(71) Applicant: Ortronics, Inc., New London, CT (US)

(72) Inventor: Ryan J. Grandidge, Wakefield, RI (US)

(73) Assignee: Ortronics, Inc., New London, CT (US)

( * ) Notice: Subject to any disclaimer, the term of this patent is extended or adjusted under 35 U.S.C. 154(b) by 1 day.

(21) Appl. No.: 16/119,311

(22) Filed: Aug. 31, 2018

(51) Int. Cl.
G02B 6/36 (2006.01)
G02B 6/38 (2006.01)
G02B 6/44 (2006.01)

(52) U.S. Cl.
CPC ......... *G02B 6/3897* (2013.01); *G02B 6/4454* (2013.01); *G02B 6/4455* (2013.01)

(58) Field of Classification Search
None
See application file for complete search history.

(56) References Cited

U.S. PATENT DOCUMENTS

| | | | |
|---|---|---|---|
| 4,717,358 A * | 1/1988 | Chaundy | G02B 6/4466 174/55 |
| 7,697,811 B2 | 4/2010 | Murano et al. | |
| 7,983,038 B2 | 7/2011 | Levesque et al. | |
| 8,106,311 B2 | 1/2012 | Larsen et al. | |
| 8,184,938 B2 | 5/2012 | Cooke et al. | |
| 8,398,039 B2 | 3/2013 | Murano et al. | |
| 8,439,702 B2 | 5/2013 | Dietz et al. | |
| 8,672,709 B2 * | 3/2014 | Dietz | H01R 13/6395 439/352 |
| 8,731,364 B2 | 5/2014 | Murano et al. | |
| 8,758,047 B2 | 6/2014 | Dietz et al. | |
| 9,606,317 B2 | 3/2017 | Grandidge et al. | |
| 10,168,502 B2 | 1/2019 | Grandidge et al. | |
| 2002/0150347 A1* | 10/2002 | Fujiwara | G02B 6/3897 385/56 |
| 2010/0220967 A1* | 9/2010 | Cooke | G02B 6/3897 385/135 |
| 2011/0085774 A1* | 4/2011 | Murphy | G02B 6/3825 385/134 |
| 2011/0091158 A1* | 4/2011 | Iwaya | G02B 6/3879 385/54 |
| 2014/0286618 A1* | 9/2014 | Bragg | H01R 13/659 385/135 |
| 2018/0129005 A1* | 5/2018 | Smith | G02B 6/4454 |
| 2018/0196213 A1* | 7/2018 | Grandidge | G02B 6/4453 |

* cited by examiner

Primary Examiner — Michelle R Connelly
(74) Attorney, Agent, or Firm — McCarter & English, LLP

(57) ABSTRACT

Improved connector assemblies for use in communication systems and related methods for using the same are provided. The present disclosure provides advantageous connector assemblies (e.g., fiber optic cassettes) having a detachable front bezel that allows the connector assemblies to be assembled, terminated and/or mounted with respect to a panel member from the rear of the panel member, thereby providing user-friendly access for the splicing and management/storage of media cables (e.g., optical fiber cables). The present disclosure provides for a connector assembly having one or more locking members. Each locking member is configured to releasably secure the connector assembly to a bezel member mounted to a panel member. Exemplary panel member can include any suitable number or combination of connector assemblies releasably mounted with respect thereto, via a respective bezel member releasably mounted to the panel member.

20 Claims, 19 Drawing Sheets

FIG. 4

DETACHABLE BEZEL FOR CASSETTE MOUNTING

FIELD OF THE DISCLOSURE

The present disclosure relates to connector assemblies for use in communication systems and, more particularly, to the design and use of a connector assembly (e.g., fiber optic cassette) having a detachable front bezel that allows the connector assembly to be assembled, terminated and/or mounted with respect to a panel member from the rear of the panel member, thereby providing user-friendly access for the splicing and management/storage of media cables (e.g., optical fiber cables).

BACKGROUND OF THE DISCLOSURE

In general, devices for interfacing with high frequency data transfer media are known. See, e.g., U.S. Pat. Nos. 8,439,702; 8,672,709 and 8,731,364, the entire contents of each being hereby incorporated by reference in their entireties.

In general, commercial buildings require an effective and efficient telecommunications infrastructure to support the wide variety of services that rely on the transport of information. Typically, wiring systems within buildings are terminated at a location where they may be interconnected with one another, and/or to other cabling systems or telecommunications equipment. Cables are often terminated on wire panels or patch panels or the like, which can be mounted to racks or to some other location/structure.

Patch panels are known in the field of data communication systems. See, e.g., U.S. Pat. No. 8,106,311, the entire contents of which is hereby incorporated by reference in its entirety. Some other exemplary assemblies/systems in this general field are described and disclosed in U.S. Pat. Nos. 7,697,811; 7,983,038; 8,184,938; 8,398,039; 8,758,047 and 9,06,317, and U.S. Patent Pub. Nos. 2018/0129005 and 2018/0196213, the entire contents of each being hereby incorporated by reference in their entireties.

A patch panel generally provides a plurality of network ports incorporated into a structural element that connect incoming and outgoing lines of a communication/electrical system (e.g., a local area network (LAN) or the like). Typical patch panels are mounted hardware units that include a plurality of port locations, and utilize cables for interconnections. A patch panel can use patch cords to create the interconnections. Patch panel systems are generally intended to facilitate organization and management in implementing telecommunications wiring systems (e.g., for high speed data networks).

In general, many rows of cabinets or racks typically fill a data center or telecommunications room. Patch panels affixed to a rack and/or a telecommunications room provide convenient access to telecommunication devices (e.g., servers) within the rack or room. As the demand for the use of telecommunication devices rapidly grows, space for such devices becomes limited and/or expensive.

A constant need exists among manufacturers to develop connector assemblies (e.g., fiber cassettes) for use in communication systems or the like that include improved features and structures. Thus, an interest exists for improved connector assemblies and related components, and related methods of use. These and other inefficiencies and opportunities for improvement are addressed and/or overcome by the assemblies, systems and methods of the present disclosure.

SUMMARY OF THE DISCLOSURE

The present disclosure provides advantageous connector assemblies and related devices, and improved methods/systems for using the same. The present disclosure provides advantageous connector assemblies (e.g., fiber optic cassettes) having a detachable front bezel that allows the connector assemblies to be assembled, terminated and/or mounted with respect to a panel member from the rear of the panel member, thereby providing user-friendly access for the splicing and management/storage of media cables (e.g., optical fiber cables).

For example and in certain embodiments, the present disclosure provides for a connector assembly having one or more locking members, with each locking member configured to releasably secure the connector assembly to a bezel member mounted to a panel member. Exemplary panel member can include any suitable number or combination of connector assemblies releasably mounted with respect thereto, via a respective bezel member releasably mounted to the panel member.

The present disclosure provides for a connector assembly including a housing that extends from a first end to a second end, the housing including a base wall, with a first rear side wall, a second rear side wall and a third rear side wall extending from the base wall; a mounting flange extending from the base wall and positioned proximal to the first end of the housing, the mounting flange housing at least a portion of one or more ports; a first locking member mounted with respect to the first rear side wall; a bezel member extending from a first end to a second end, the bezel member having one or more receipt apertures; and a panel member having a front panel surface and a rear side, the panel member including an aperture; wherein after mounting the bezel member to the front panel surface and with respect to the aperture of the panel member, and after mounting the housing with respect to the rear side of the panel member and with respect to the aperture of the panel member so that at least a portion of the one or more ports are positioned within the one or more receipt apertures of the bezel member, the first locking member is configured to be moved from an unlocked position to a locked position to lockingly engage the housing, the bezel member and the panel member with respect to one another.

The present disclosure also provides for a connector assembly wherein the housing is a splice cassette housing, and the panel member is a patch panel member or a multi-connector panel member; and wherein the one or more ports are fiber optic ports for mating with fiber optic connectors.

The present disclosure also provides for a connector assembly wherein the mounting flange and the first, second and third rear side walls extend orthogonally from the base wall. The present disclosure also provides for a connector assembly wherein the mounting flange and the first, second and third rear side walls form a substantially continuous wall structure that extends around the base wall and defines a receiving cavity therein.

The present disclosure also provides for a connector assembly wherein the bezel member includes a slot positioned proximal to the first end of the bezel member; and wherein when the first locking member is moved from the unlocked position to the locked position, at least a portion of the first locking member is positioned within the slot of the bezel member to lockingly engage the housing, the bezel member and the panel member with respect to one another.

The present disclosure also provides for a connector assembly further including a second locking member mounted with respect to the second rear side wall; wherein after mounting the bezel member to the front panel surface and with respect to the aperture of the panel member, and after mounting the housing with respect to the rear side of the panel member and with respect to the aperture of the panel member so that at least a portion of the one or more ports are positioned within the one or more receipt apertures of the bezel member, the first and second locking members are configured to be moved from an unlocked position to a locked position to lockingly engage the housing, the bezel member and the panel member with respect to one another.

The present disclosure also provides for a connector assembly further including a cover member releasably mounted to the housing, the cover member including a top wall, with a first outer wall, a second outer wall and a third outer wall extending from the top wall; wherein after releasably mounting the cover member to the housing, the first outer wall is substantially positioned around and over first rear side wall, and the second outer wall is substantially positioned around and over second rear side wall, and the third outer wall is substantially positioned around and over third rear side wall.

The present disclosure also provides for a connector assembly wherein the first locking member is mounted with respect to the first outer wall. The present disclosure also provides for a connector assembly wherein the first outer wall includes a mounting area that is configured to allow the first locking member to be releasably mounted, the mounting area including an enlarged aperture configured to allow a mounting member of the first locking member to pass through for mounting.

The present disclosure also provides for a connector assembly wherein the first rear side wall includes a channel, the channel configured to at least partially house the first locking member therein.

The present disclosure also provides for a connector assembly wherein an engagement member extends from the mounting flange; and wherein after mounting the housing with respect to the rear side of the panel member and with respect to the aperture of the panel member so that at least a portion of the one or more ports are positioned within the one or more receipt apertures of the bezel member, at least a portion of the engagement member is positioned within the slot of the bezel member. The present disclosure also provides for a connector assembly wherein when the first locking member is moved from the unlocked position to the locked position, at least a portion of the engagement member and at least a portion of the first locking member are both positioned within the slot of the bezel member to lockingly engage the housing, the bezel member and the panel member with respect to one another. The present disclosure also provides for a connector assembly wherein the engagement member is an extension of at least a portion of the first rear side wall.

The present disclosure also provides for a connector assembly wherein after the first locking member is moved from the unlocked position to the locked position, the first locking member is configured to be moved from the locked position to the unlocked position to allow for the disengagement of the housing, the bezel member and the panel member from one another.

The present disclosure also provides for a connector assembly wherein the panel member is configured to be mounted with respect to a media patching system, and the media patching system is configured to be mounted with respect to a supporting structure.

The present disclosure also provides for a method for utilizing a connector assembly including providing a housing that extends from a first end to a second end, the housing including a base wall, with a first rear side wall, a second rear side wall and a third rear side wall extending from the base wall; providing a mounting flange extending from the base wall and positioned proximal to the first end of the housing, the mounting flange housing at least a portion of one or more ports; mounting a first locking member with respect to the first rear side wall; providing a bezel member extending from a first end to a second end, the bezel member having one or more receipt apertures; and providing a panel member having a front panel surface and a rear side, the panel member including an aperture; mounting the bezel member to the front panel surface and with respect to the aperture of the panel member; mounting the housing with respect to the rear side of the panel member and with respect to the aperture of the panel member so that at least a portion of the one or more ports are positioned within the one or more receipt apertures of the bezel member; and moving the first locking member from an unlocked position to a locked position to lockingly engage the housing, the bezel member and the panel member with respect to one another. The present disclosure also provides for a method for utilizing a connector assembly wherein the housing is a splice cassette housing, and the panel member is a patch panel member or a multi-connector panel member; wherein the one or more ports are fiber optic ports for mating with fiber optic connectors; wherein the mounting flange and the first, second and third rear side walls extend orthogonally from the base wall; and wherein the mounting flange and the first, second and third rear side walls form a substantially continuous wall structure that extends around the base wall and defines a receiving cavity therein.

The present disclosure also provides for a method for utilizing a connector assembly wherein the bezel member includes a slot positioned proximal to the first end of the bezel member; and wherein when the first locking member is moved from the unlocked position to the locked position, at least a portion of the first locking member is positioned within the slot of the bezel member to lockingly engage the housing, the bezel member and the panel member with respect to one another.

The present disclosure also provides for a method for utilizing a connector assembly further including a second locking member mounted with respect to the second rear side wall; wherein after mounting the bezel member to the front panel surface and with respect to the aperture of the panel member, and after mounting the housing with respect to the rear side of the panel member and with respect to the aperture of the panel member so that at least a portion of the one or more ports are positioned within the one or more receipt apertures of the bezel member, the first and second locking members are moved from the unlocked position to the locked position to lockingly engage the housing, the bezel member and the panel member with respect to one another.

The present disclosure also provides for a connector assembly including a housing that extends from a first end to a second end, the housing including a base wall, with a first rear side wall, a second rear side wall and a third rear side wall extending from the base wall; a mounting flange extending from the base wall and positioned proximal to the first end of the housing, the mounting flange housing at least a portion of one or more ports; a cover member releasably mounted to the housing, the cover member including a top wall, with a first outer wall, a second outer wall and a third outer wall extending from the top wall; a first locking member mounted with respect to the first rear side wall and with respect to the first outer wall; a second locking member mounted with respect to the second rear side wall and with respect to the second outer wall; a bezel member extending from a first end to a second end, the bezel member having one or more receipt apertures; and a panel member having a front panel surface and a rear side, the panel member including an aperture; wherein after releasably mounting the cover member to the housing, the first outer wall is substantially positioned around and over first rear side wall, and the second outer wall is substantially positioned around and over second rear side wall, and the third outer wall is substantially positioned around and over third rear side wall; wherein after mounting the bezel member to the front panel surface and with respect to the aperture of the panel member, and after mounting the housing with respect to the rear side of the panel member and with respect to the aperture of the panel member so that at least a portion of the one or more ports are positioned within the one or more receipt apertures of the bezel member, the first and second locking members are configured to be moved from an unlocked position to a locked position to lockingly engage the housing, the bezel member and the panel member with respect to one another.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

Figure 4:
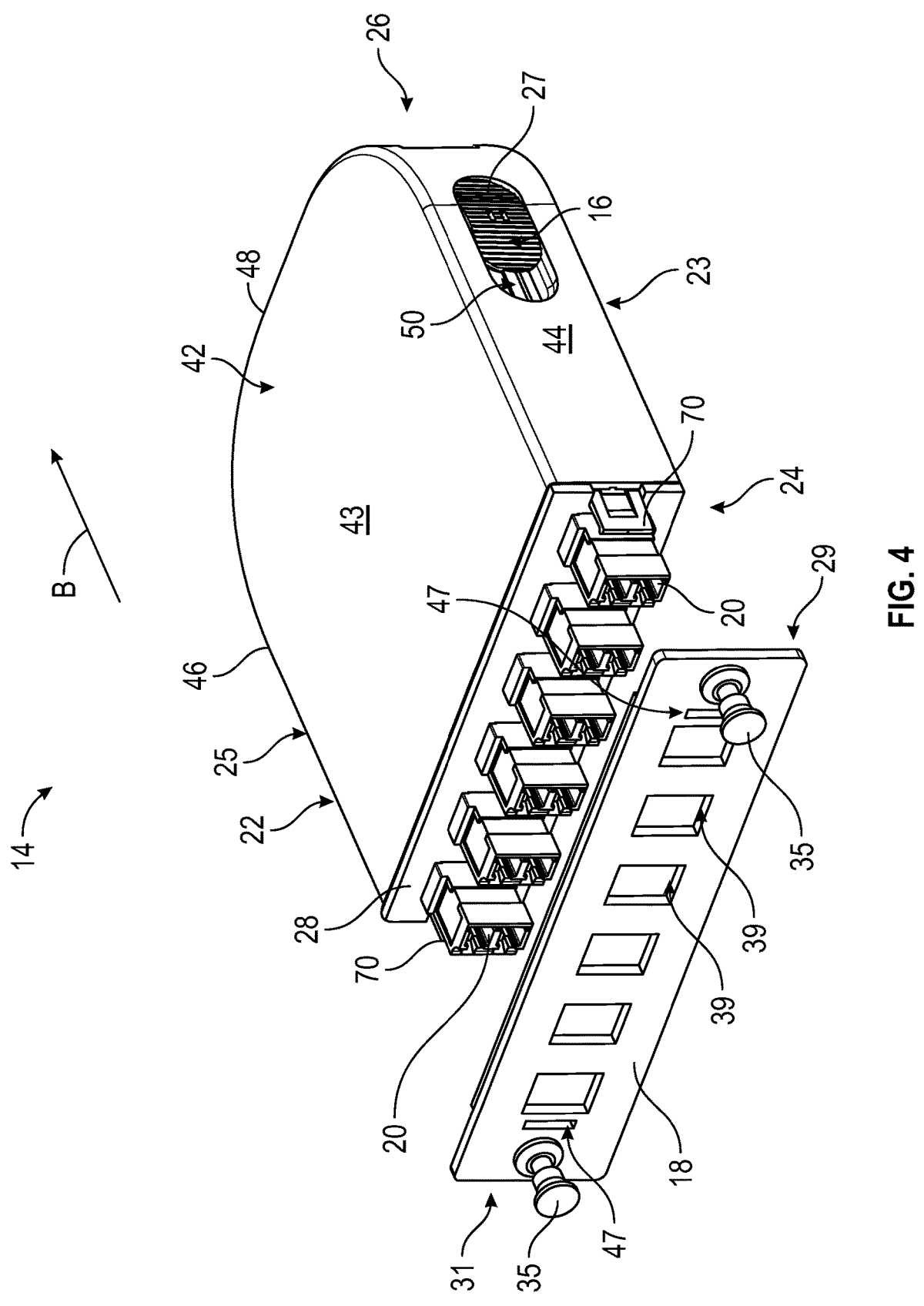

FIGS. 4-6 are side perspective views of the connector assembly of FIG. 1;

DETAILED DESCRIPTION OF DISCLOSURE

Figure 1:
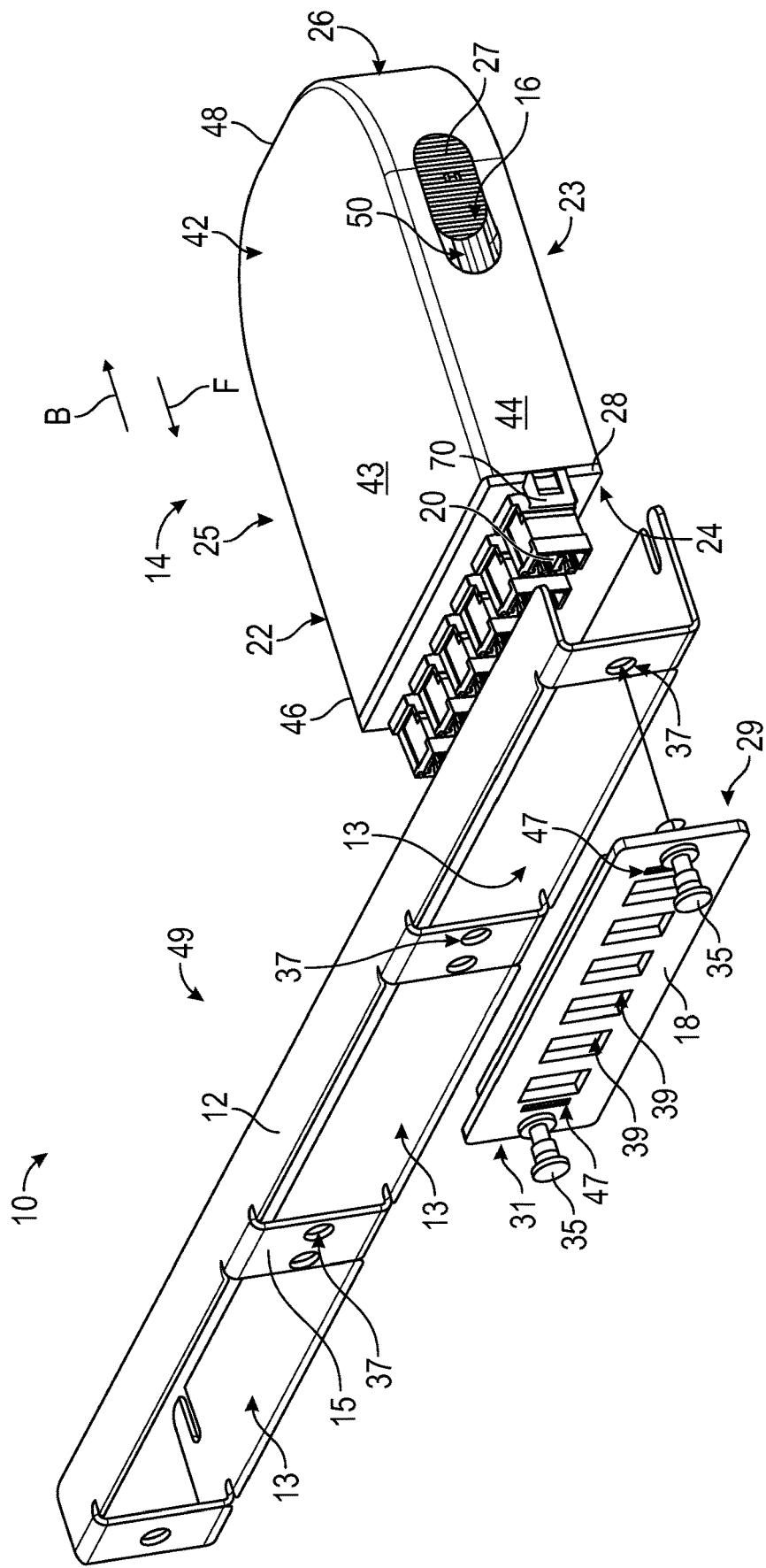
FIG. 1 is a side perspective view of an exemplary connector assembly and panel member according to the present disclosure, prior to mounting with respect to one another.

The exemplary embodiments disclosed herein are illustrative of advantageous connector assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary assemblies/fabrication methods and associated processes/techniques of assembly and use are not to be interpreted as limiting, but merely as the basis for teaching one skilled in the art how to make and use the advantageous assemblies/systems and/or alternative assemblies of the present disclosure.

The present disclosure provides improved connector assemblies and related devices, and related methods of use. The present disclosure provides advantageous connector assemblies (e.g., fiber optic cassettes) having a detachable front bezel that allows the connector assemblies to be assembled, terminated and/or mounted with respect to a panel member from the rear of the panel member, thereby providing user-friendly access for the splicing and management/storage of media cables (e.g., optical fiber cables).

In exemplary embodiments, the present disclosure provides for a connector assembly having one or more locking members. Each locking member is configured to releasably secure the connector assembly to a bezel member mounted to a panel member. In general, exemplary panel member can include any suitable number or combination of connector assemblies releasably mounted with respect thereto, via a respective bezel member releasably mounted to the panel member.

Referring now to the drawings, like parts are marked throughout the specification and drawings with the same reference numerals, respectively. Drawing figures are not necessarily to scale and in certain views, parts may have been exaggerated for purposes of clarity.

Figure 2:
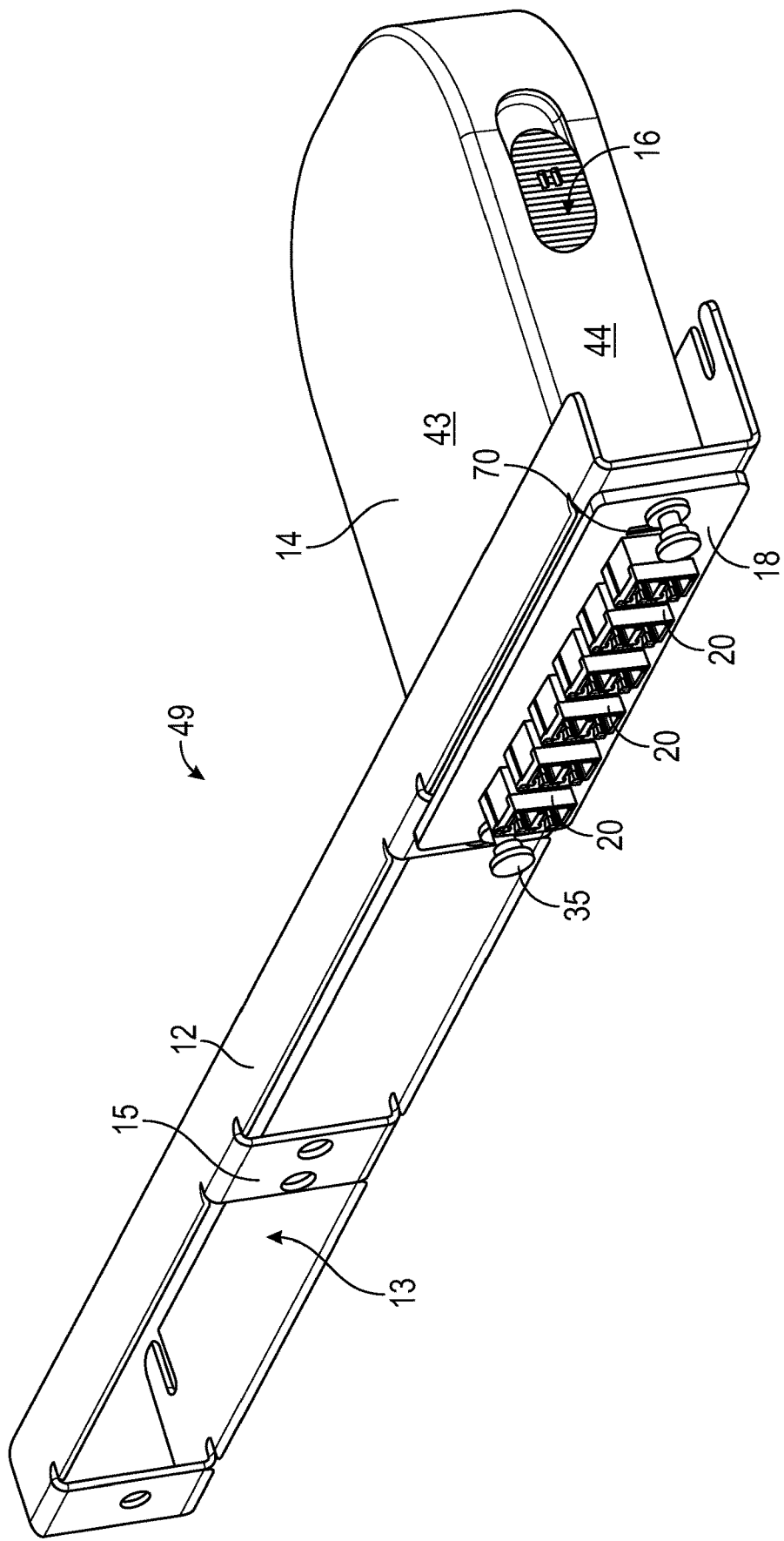
FIG. 2 is a side perspective view of the connector assembly and panel member of FIG. 1, after mounting with respect to one another.

With reference to FIGS. 1-2, there is illustrated an embodiment of an exemplary media patching system 10 according to the present disclosure.

Panel members 12 (e.g., patch panel members/multi-connector panel members 12) can be utilized with (e.g., mounted to) system 10 to support multiple media connections. As described and disclosed in U.S. Pat. No. 906,317, system 10 may or may not include top covers, a lower cable management plate, bracket members, and a door assembly. System 10 can be configured to be mounted with respect to a supporting structure (e.g., a rack) or the like. It is noted that exemplary media patching systems 10 can be adapted for use in conjunction with a rack (e.g., network or server rack) or the like, although the present disclosure is not limited thereto. Rather, the disclosed media patching systems 10 can be adapted for use in conjunction with other structures, such as, for example, frames, cabinets, supporting structures, or other structures that stand to benefit from proximate cable management functionality. For ease of disclosure, the potential structures to which the disclosed systems 10 may be mounted are collectively referred to as "racks." However, it is to be understood that the present disclosure is not limited by or to implementations wherein the disclosed systems 10 are mounted with respect to, or used in conjunction with, a rack, but may be mounted with respect to, or used in conjunction with other structures/units (e.g., structures/units associated with cable routing).

As noted, panel members 12 can be utilized with system 10 to support multiple media connections. As shown in FIG. 1, exemplary panel member 12 has a front panel surface/segment 15 that includes a plurality of apertures 13 therethrough. As discussed in further detail below, each aperture 13 is typically configured and dimensioned to have a connector assembly 14, 14' mounted with respect thereto. It is noted that panel member 12 can take a variety of shapes, forms and/or geometries, and can include any suitable number of apertures 13.

Figure 18:
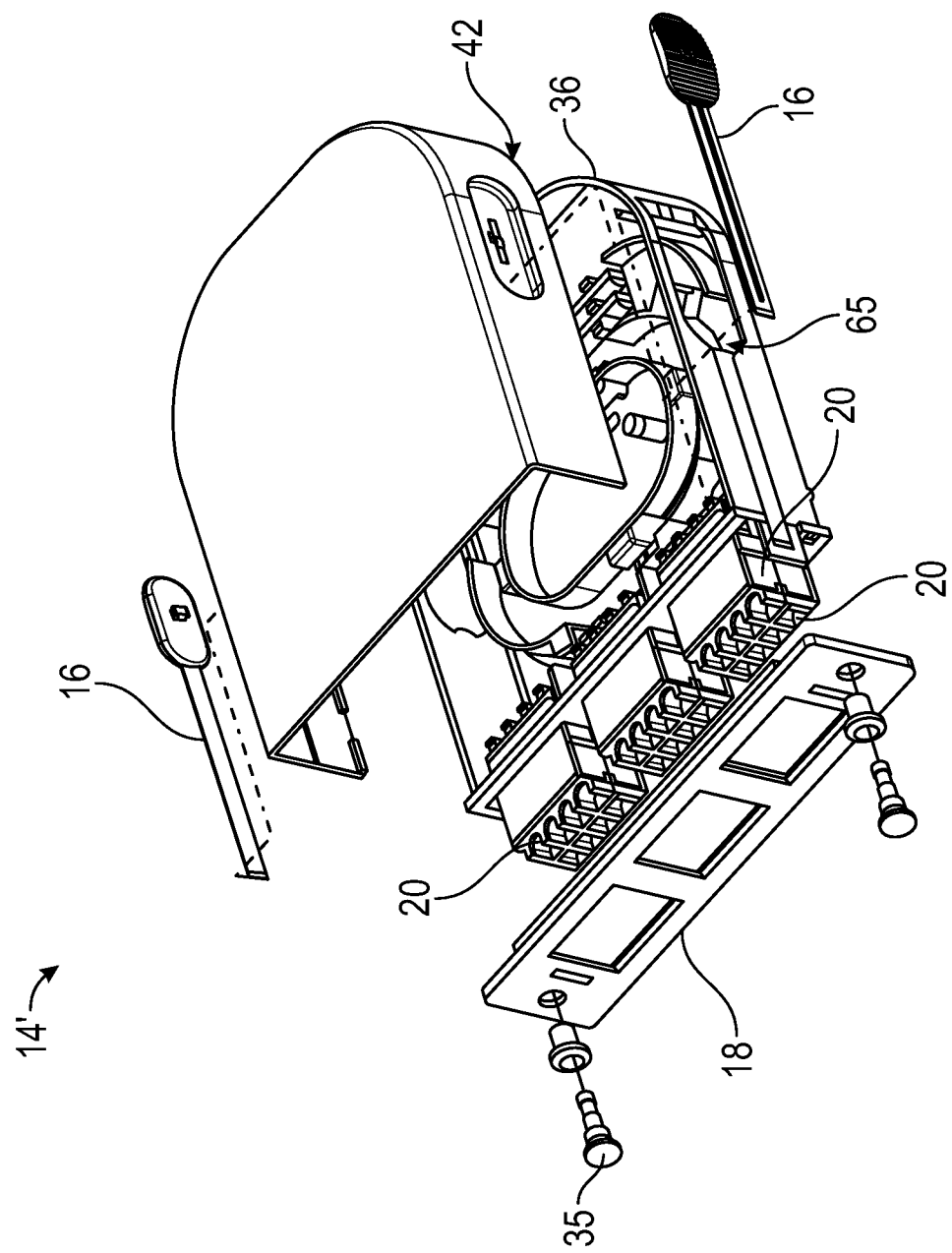
FIG. 18 is an exploded top perspective view of another exemplary connector assembly according to the present disclosure.
Figure 19:
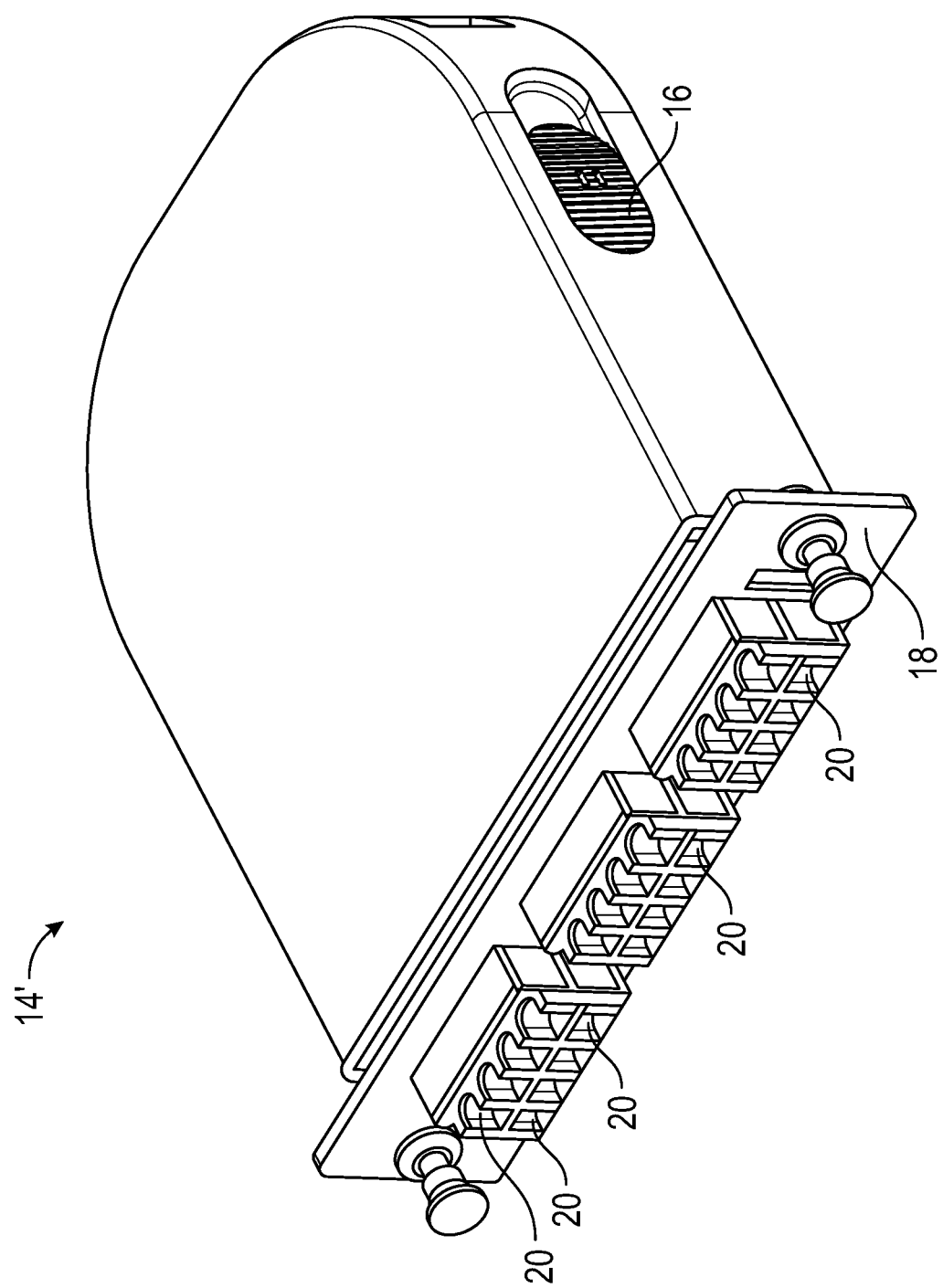
FIG. 19 is a top perspective view of the connector assembly of FIG. 18.

In general, one or more connector assemblies 14, 14' can be mounted with respect to panel member 12 (e.g., with one aperture 13 configured to house/mount to one assembly 14, 14'). More particularly, each connector assembly 14, 14' typically includes one or more locking members 16 (FIGS. 3 and 18), with each locking member 16 configured to releasably secure the connector assembly 14, 14' to a bezel member 18 mounted to the panel member 12. Panel member 12 can include any suitable number/combination of connector assemblies 14, 14' releasably mounted with respect thereto (e.g., one, two, three, four, six, twelve, a plurality, etc.), via a respective bezel member 18 releasably mounted to panel member 12.

As shown in FIGS. 1-6 and 18-19, exemplary connector assembly 14, 14' takes the form of a fiber optic cassette 14, 14' having a plurality of fiber optic ports/adapters 20 (e.g., twelve ports/adapters 20 for assembly 14; twenty-four ports/adapters 20 for assembly 14') for mating with fiber optic connectors. It is noted that connector assembly 14, 14' can include any suitable number of fiber optic ports/adapters 20.

Figure 3:
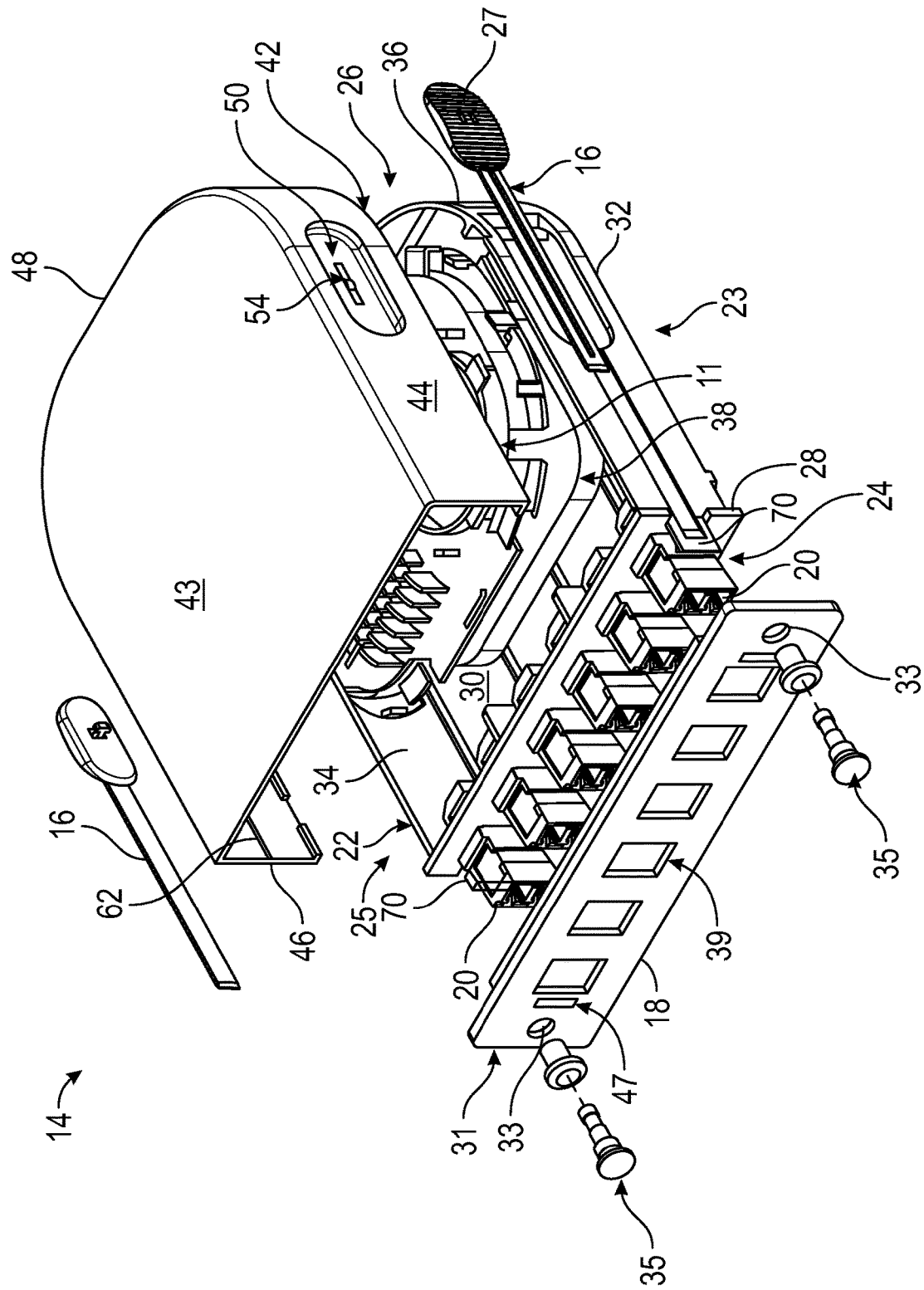
FIG. 3 is an exploded top perspective view of the connector assembly of FIG. 1.
Figure 5:
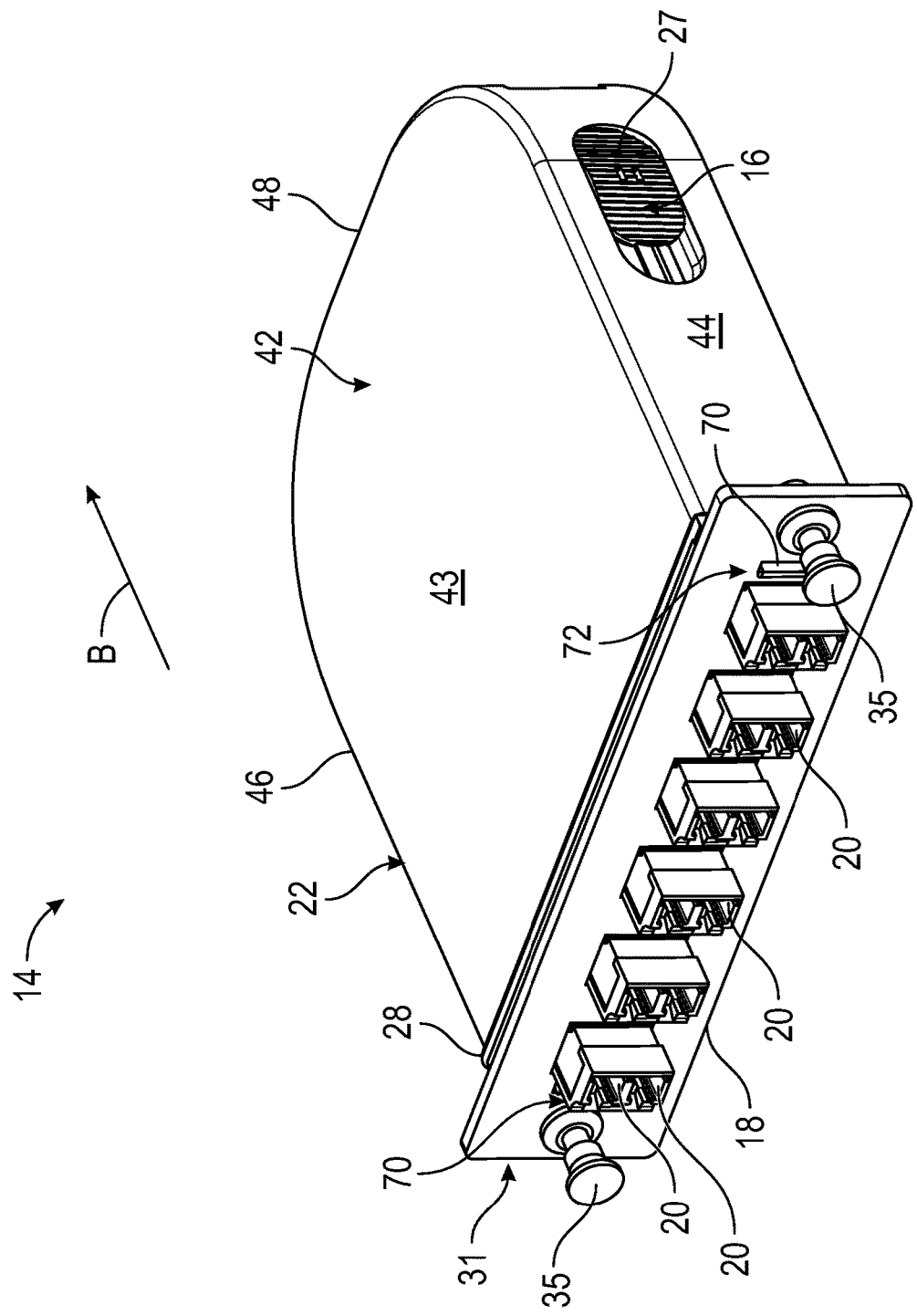
Figure 6:
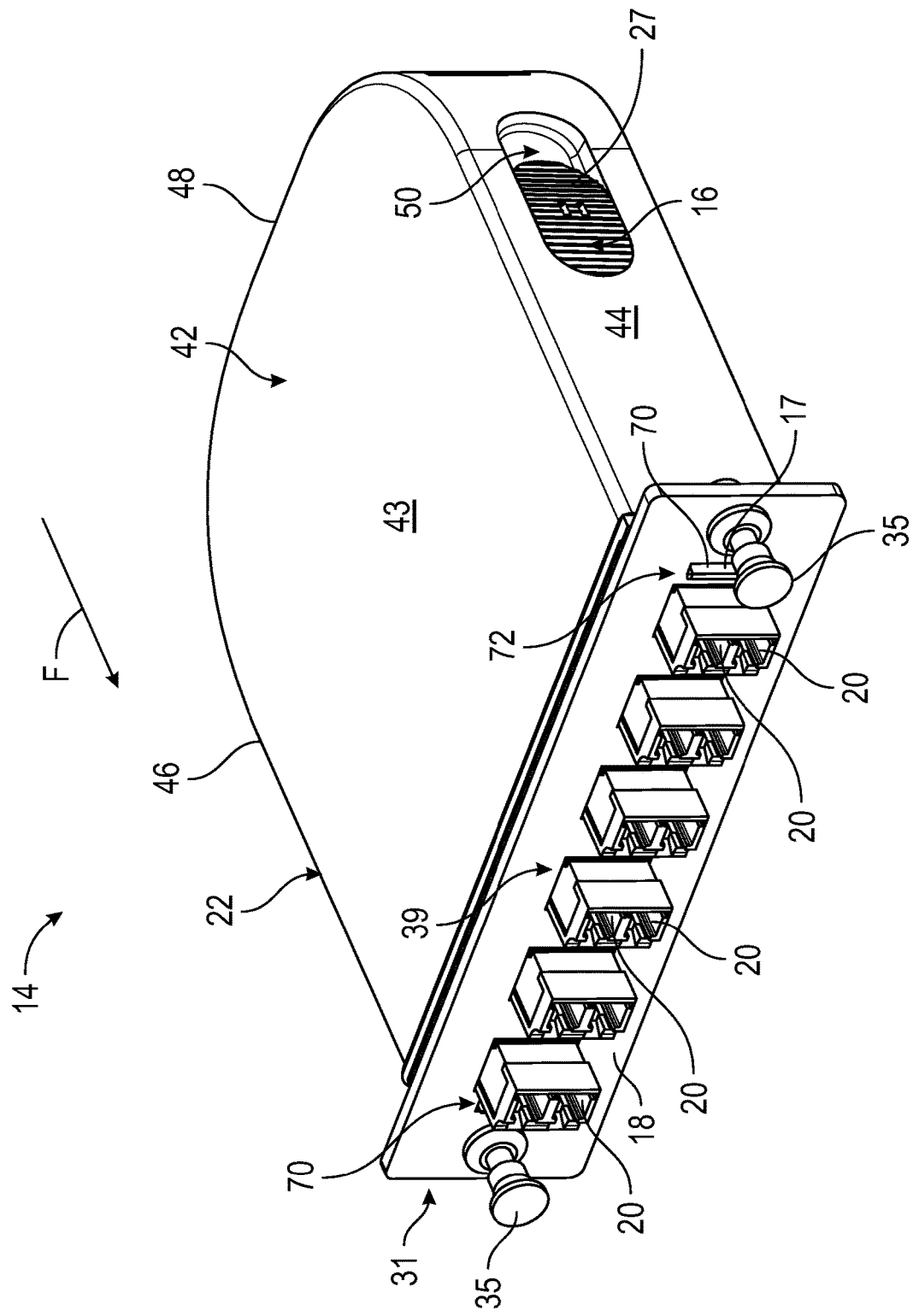

In exemplary embodiments and as shown in FIGS. 1-3, connector assembly 14 includes housing 22 that extends from a first end 24 to a second end 26, and includes a mounting flange 28 positioned proximal to first end 24 of the housing 22. In general, mounting flange 28 and/or first end 24 of housing 20 is configured to house at least a portion of the ports/adapters 20. Exemplary housing 22 of connector assembly 14 takes the form of a splice cassette housing 22 or the like, although the present disclosure is not limited thereto. Rather, housing 22 can take a variety of forms/designs.

Exemplary housing 22 includes a base wall 30, with a first rear side wall 32, a second rear side wall 34 and a third rear side wall 36 extending (e.g., orthogonally extending) from the base wall 30. The base wall 30 of the housing 22 can extend from the first end 24 to the second end 26, and can extend from a first side 23 to a second side 25.

Exemplary mounting flange 28 also can extend (e.g., orthogonally extend) from base wall 30 proximal to first end 24 of housing 22, with the mounting flange 28 extending from the first rear side wall 32 at first side 23 of housing 22 to the second rear side wall 34 at second side 25 of housing 22 (FIG. 3).

In certain embodiments and as depicted in FIG. 3, first rear side wall 32 is positioned at first side 23, and extends from the mounting flange 28 to the third rear side wall 36 positioned at the second end 26. Second rear side wall 34 is positioned at second side 25, and extends from the mounting flange 28 to the third rear side wall 36 positioned at the second end 26.

In exemplary embodiments, walls 32, 34, 36 and flange 28 form a substantially continuous wall structure that extends around and from base wall 30, thereby defining a receiving cavity 38 therein.

Figure 11:
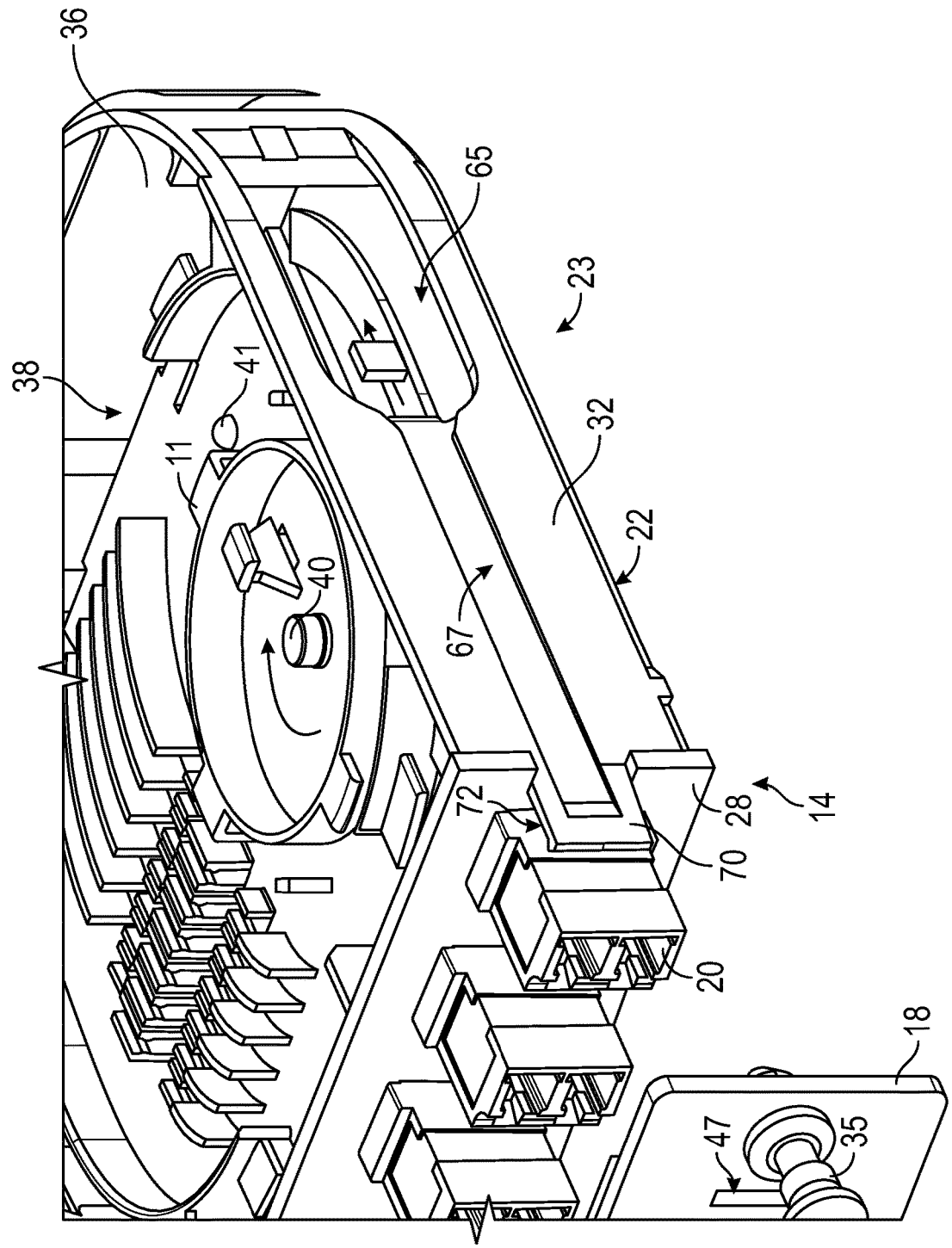
Figure 12:
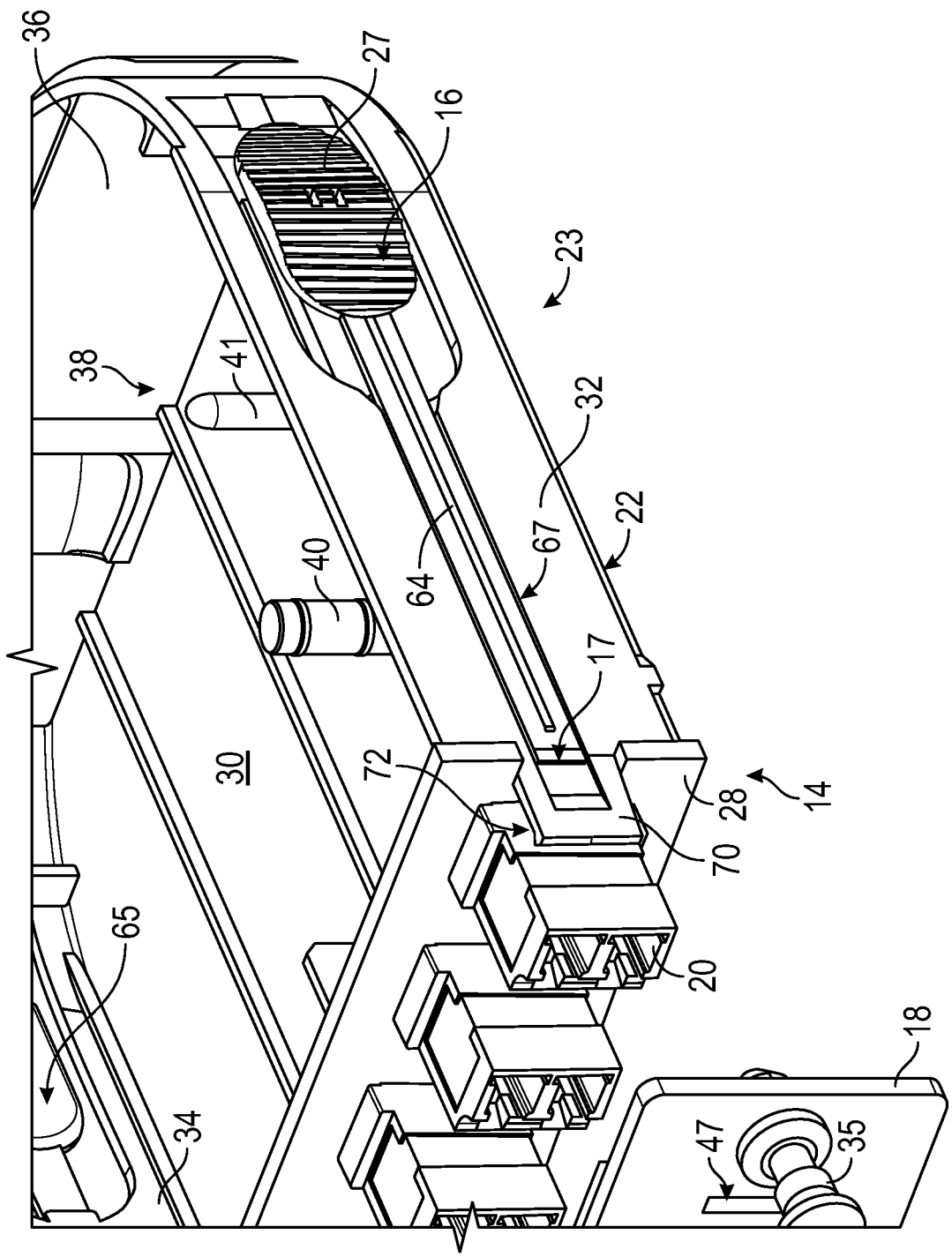
Figure 13:
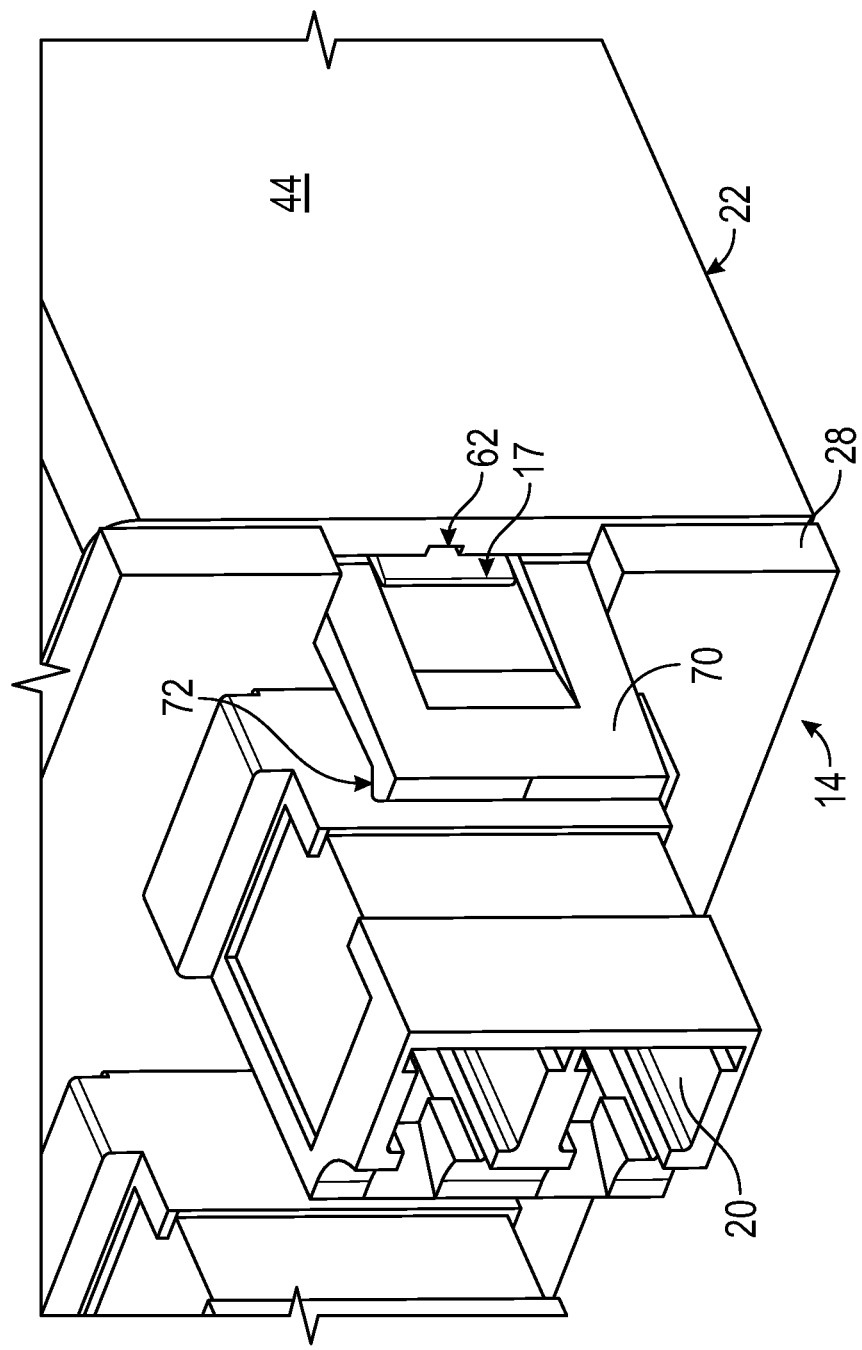
Figure 14:
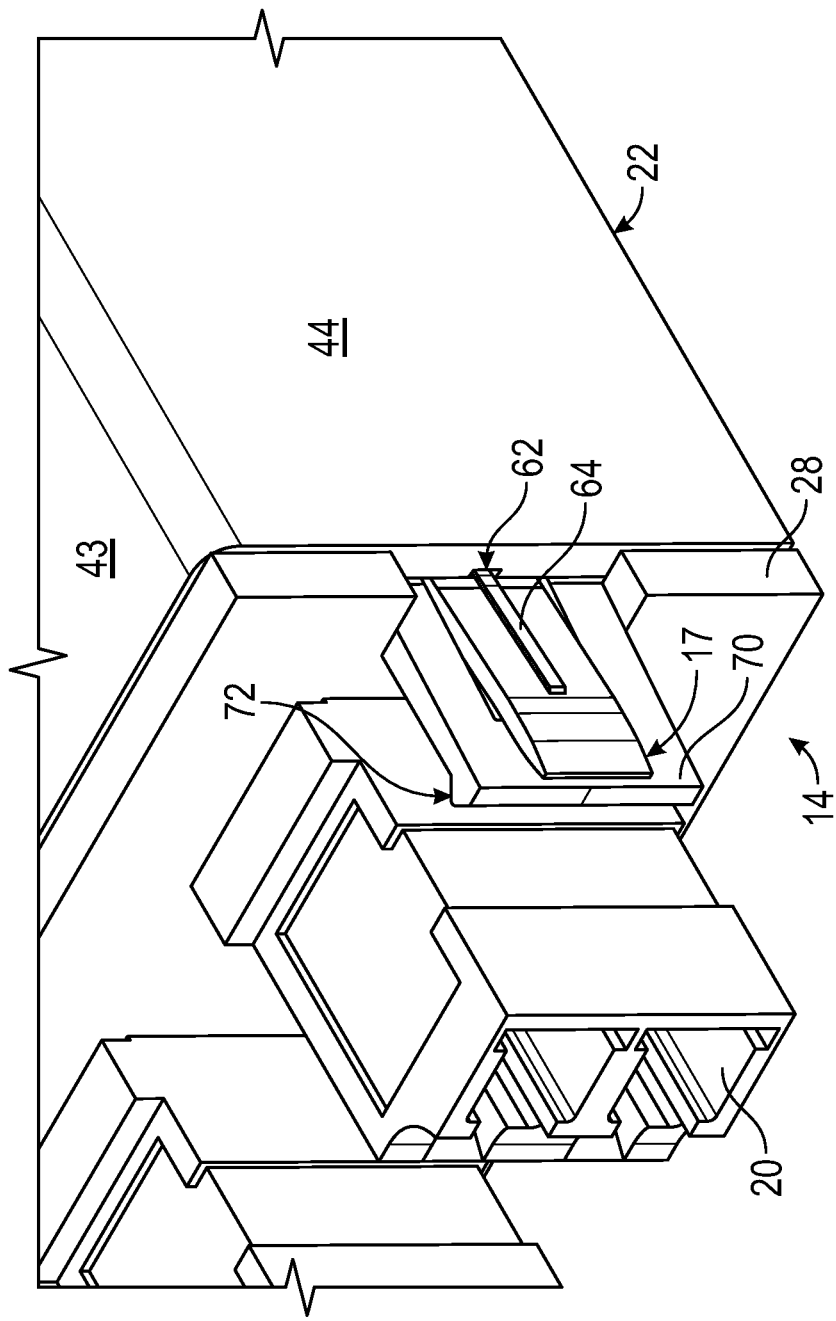
Figure 15:
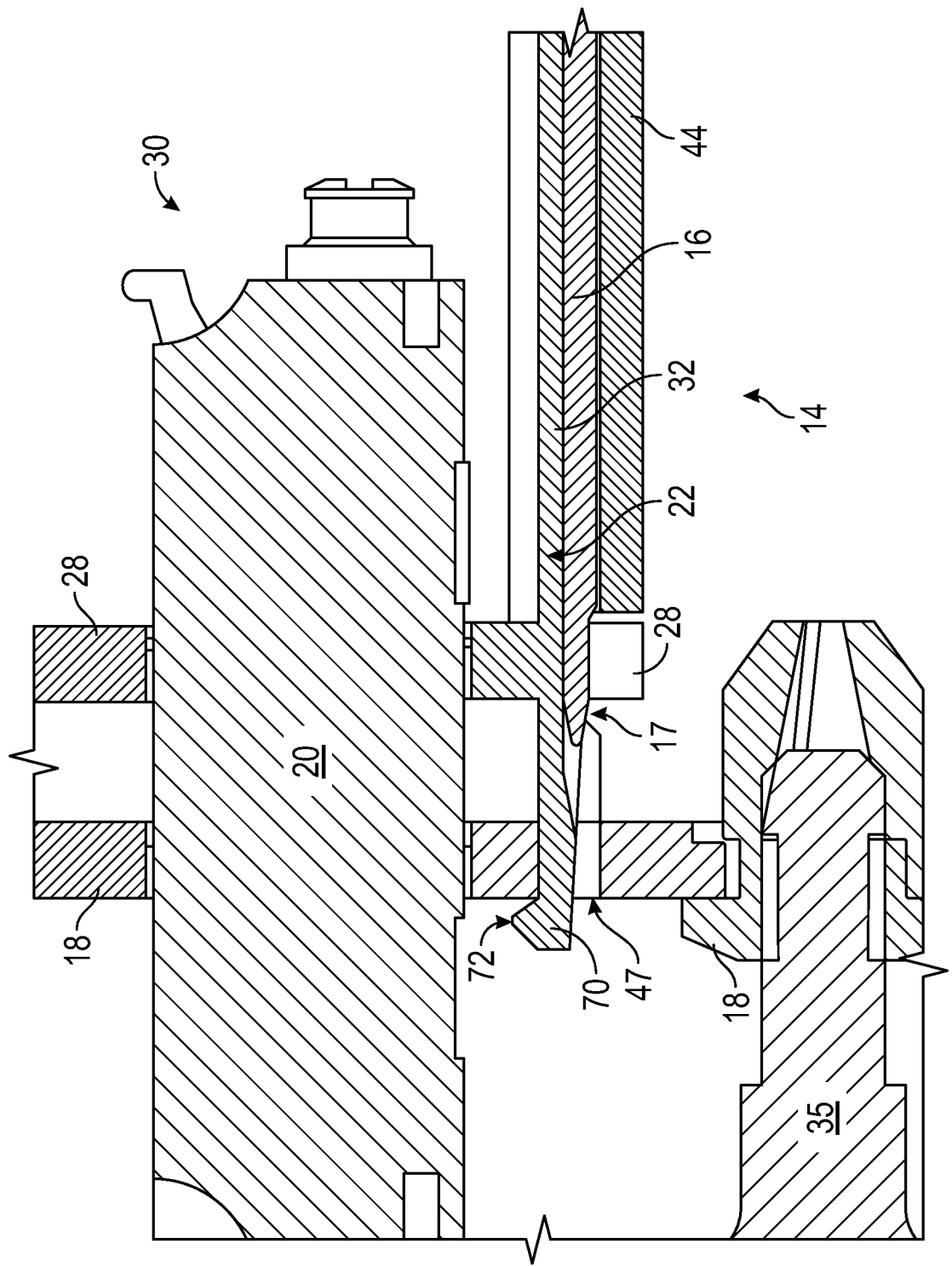
FIGS. 15-17 are partial top sectional views of the connector assembly of FIG. 1.
Figure 16:
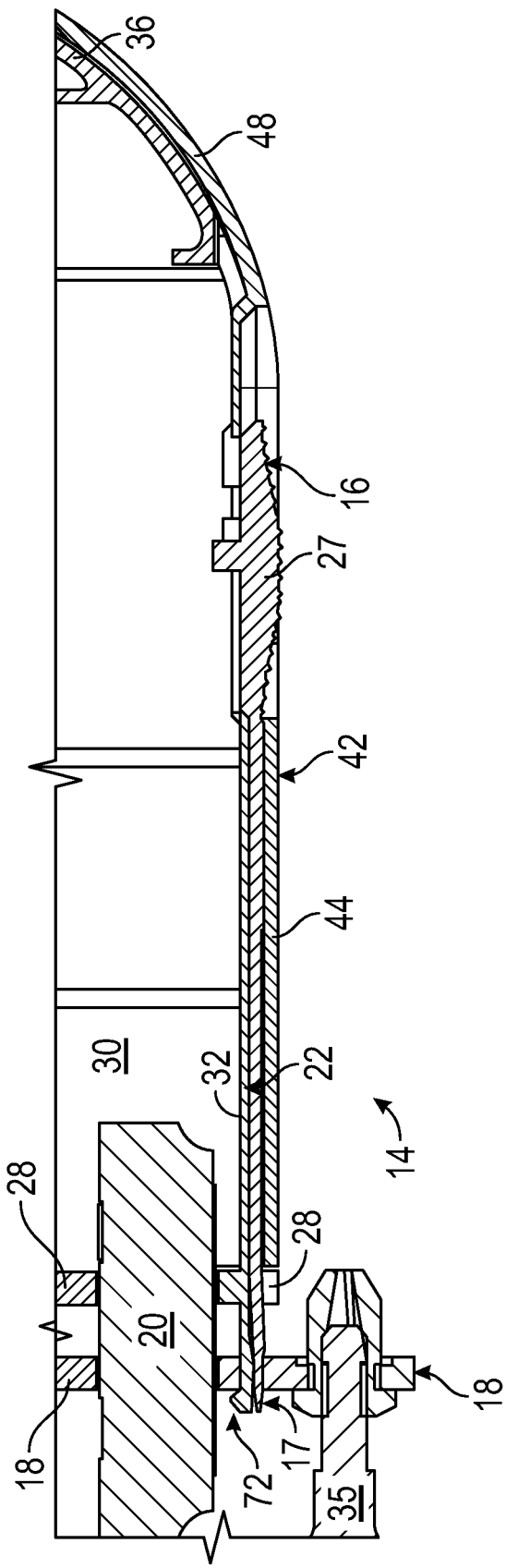
Figure 17:
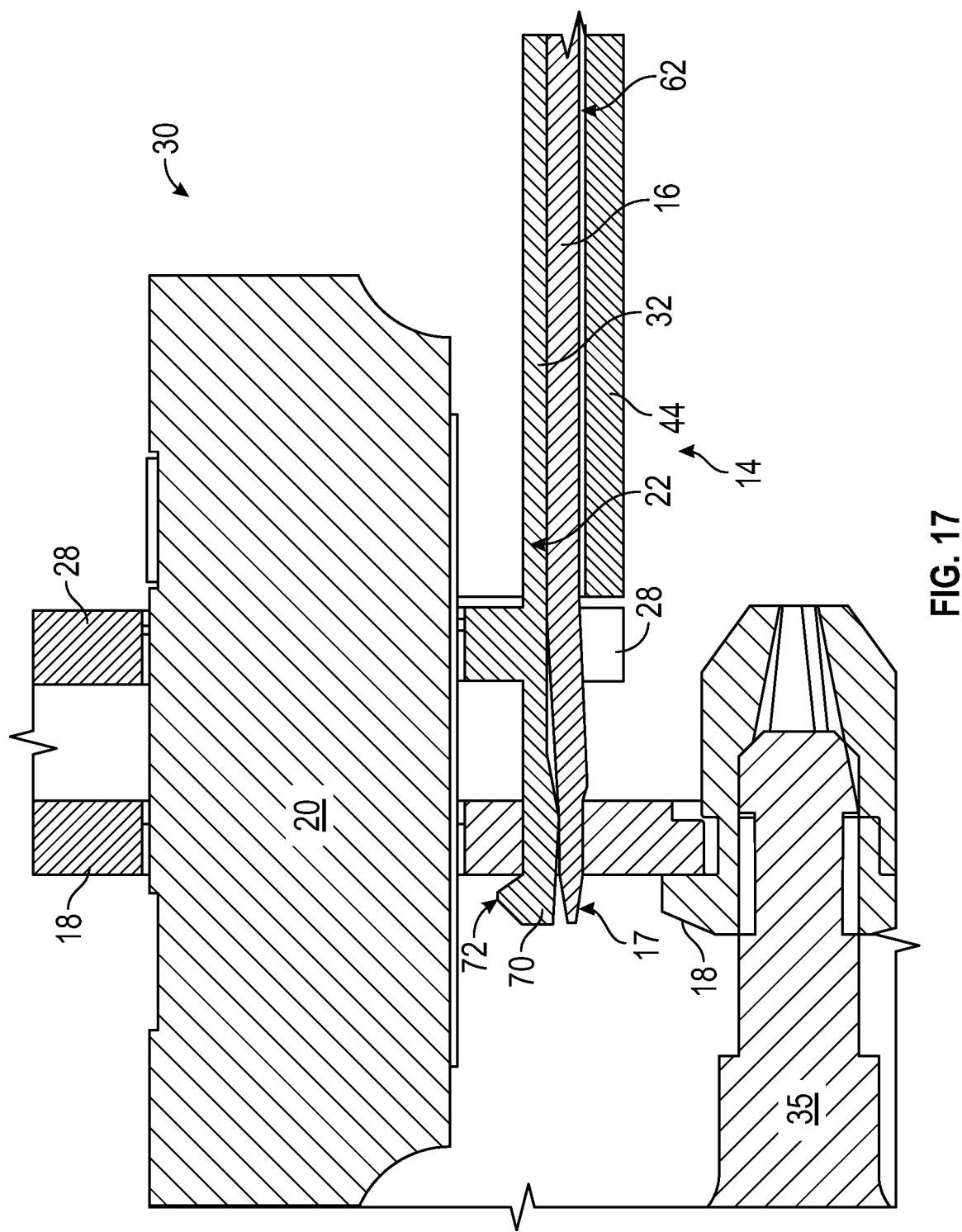

As described and disclosed in U.S. Patent Pub. No. 2018/0129005, a suitable splice manager 11 or the like can be removably mounted and positioned neatly within or into the receiving cavity 38 of housing 22 of connector assembly 14 (FIGS. 3 and 11).

Figure 10:
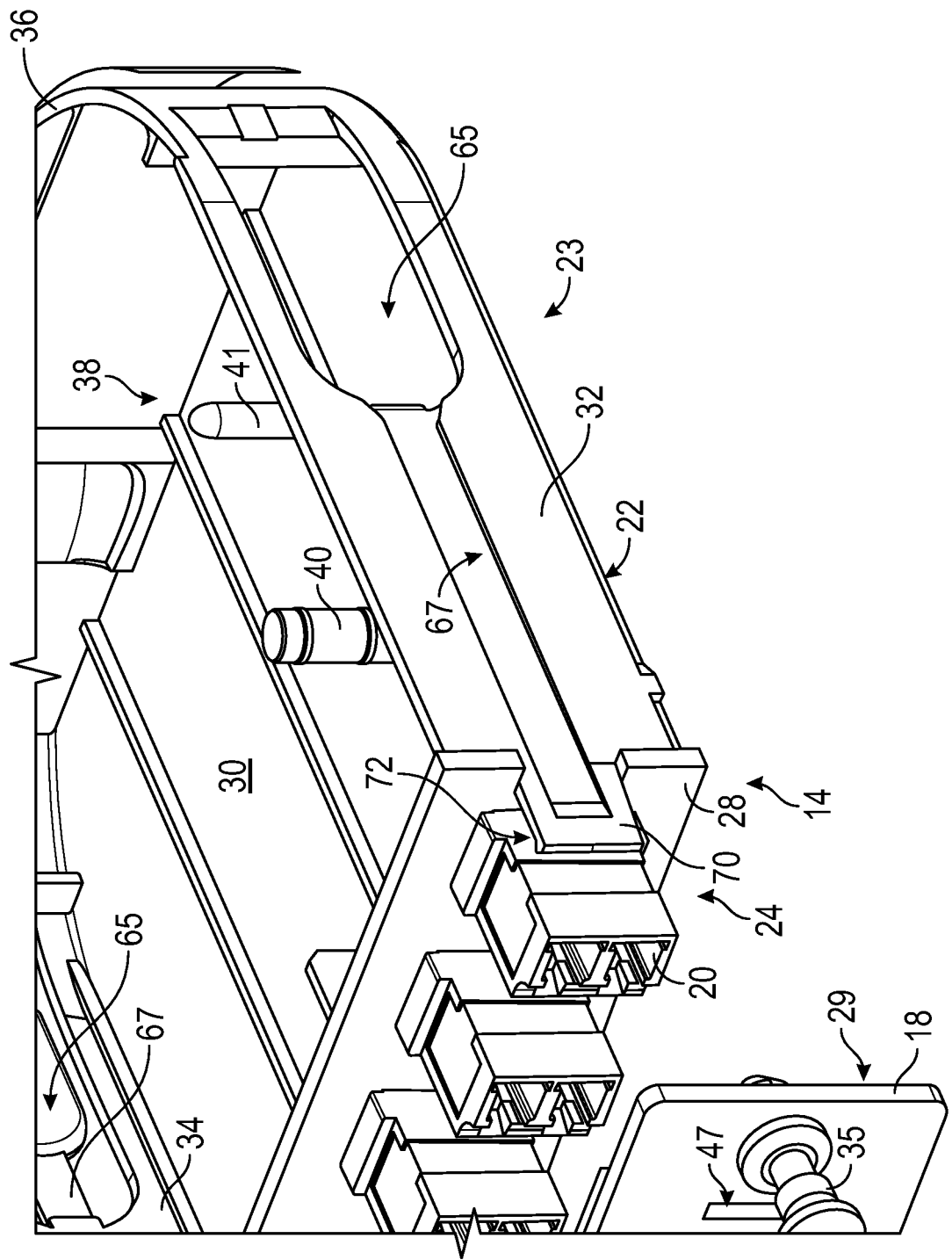
FIGS. 10-14 are partial side perspective views of the connector assembly of FIG. 1.

For example and in certain embodiments, splice manager 11 or the alternative splice managers described and disclosed in U.S. Patent Pub. No. 2018/0129005 can be removably mounted to housing 22 (e.g., splice cassette housing 22). In an embodiment and as shown in FIGS. 10-11, first protrusion 40 (e.g., cylindrical protrusion 40) of base wall 30 of housing 22 is inserted through a first aperture of splice manager 11, and second protrusion 41 (e.g., cylindrical protrusion 41) of base wall 30 is inserted through a second aperture of splice manager 11 to removably mount splice manager 11 to housing 22.

As also described and disclosed in U.S. Patent Pub. No. 2018/0129005, the splice manager 11 is removable from the housing 22 by moving the splice manager 11 until the first and second protrusions 40, 41 are no longer positioned in the first and second apertures of splice manager 11. When the splice manager 11 is not mounted to the housing 22, this advantageously allows for the fusion splicing of the optical fibers associated with connector assembly 14, 14' to be performed out in the open (e.g., away from housing 22). After spooling the fiber slack/excess on a respective spool of the splice manager 11, the splice manager 11 can be re-mounted to housing 22 via protrusions 40, 41. Since the exemplary splice manager 11 or the like is removable, splicing can take place in an open area, spooled up and routed, and simply dropped into the housing 22 (cassette housing 22). In other words, these exemplary splice managers 11 or the like not only allow the housing 22 to be more compact, they also can dispense with the need for external supporting spools, and also make the process of splicing simpler and easier for those who employ it.

Referring back to FIGS. 1-6, exemplary housing 22 also includes a cover member 42 that includes a top wall 43, and also includes a first outer wall 44, a second outer wall 46 and a third outer wall 48 extending (e.g., orthogonally extending) from the top wall 43. After the cover member 42 is releasably mounted with respect to the base wall 30 of housing 22 (e.g., via releasably mounting the walls 44, 46 and/or 48 to walls 32, 34 and/or 36), the top wall 43 of the cover member 42 can extend from the first end 24 to the second end 26, and can extend from the first side 23 to the second side 25.

Moreover and after releasably mounting cover member 42 with respect to base wall 30, the first outer wall 44 is substantially positioned around and over first rear side wall 32, and the second outer wall 46 is substantially positioned around and over second rear side wall 34, and the third outer wall 48 is substantially positioned around and over third rear side wall 36, thereby enclosing receiving cavity 38 (e.g., enclosing receiving cavity 38 having splice manager 11 or the like mounted thereon).

Figure 7:
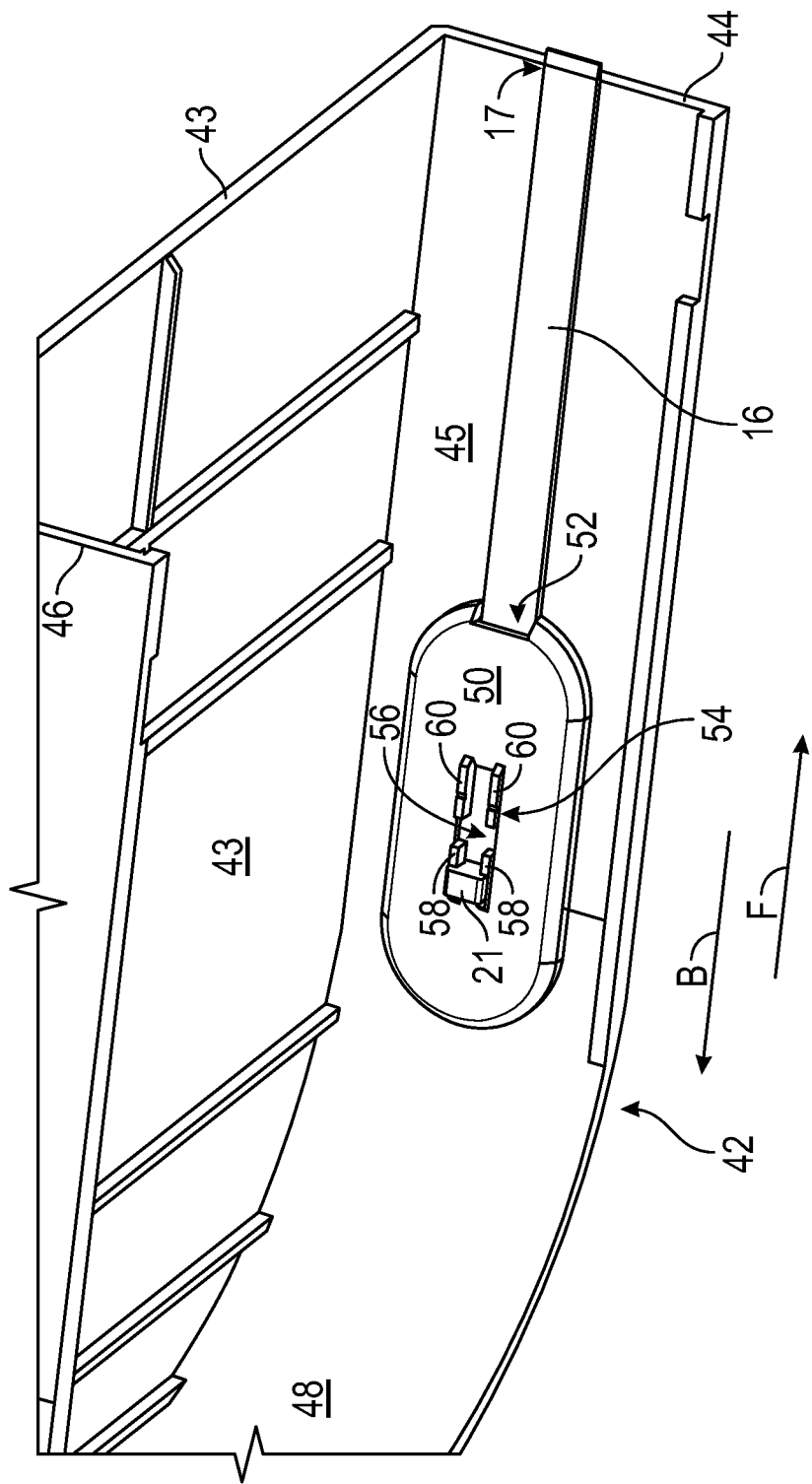
FIG. 7 is a bottom perspective view of a cover member of the connector assembly of FIG. 1.
Figure 8:
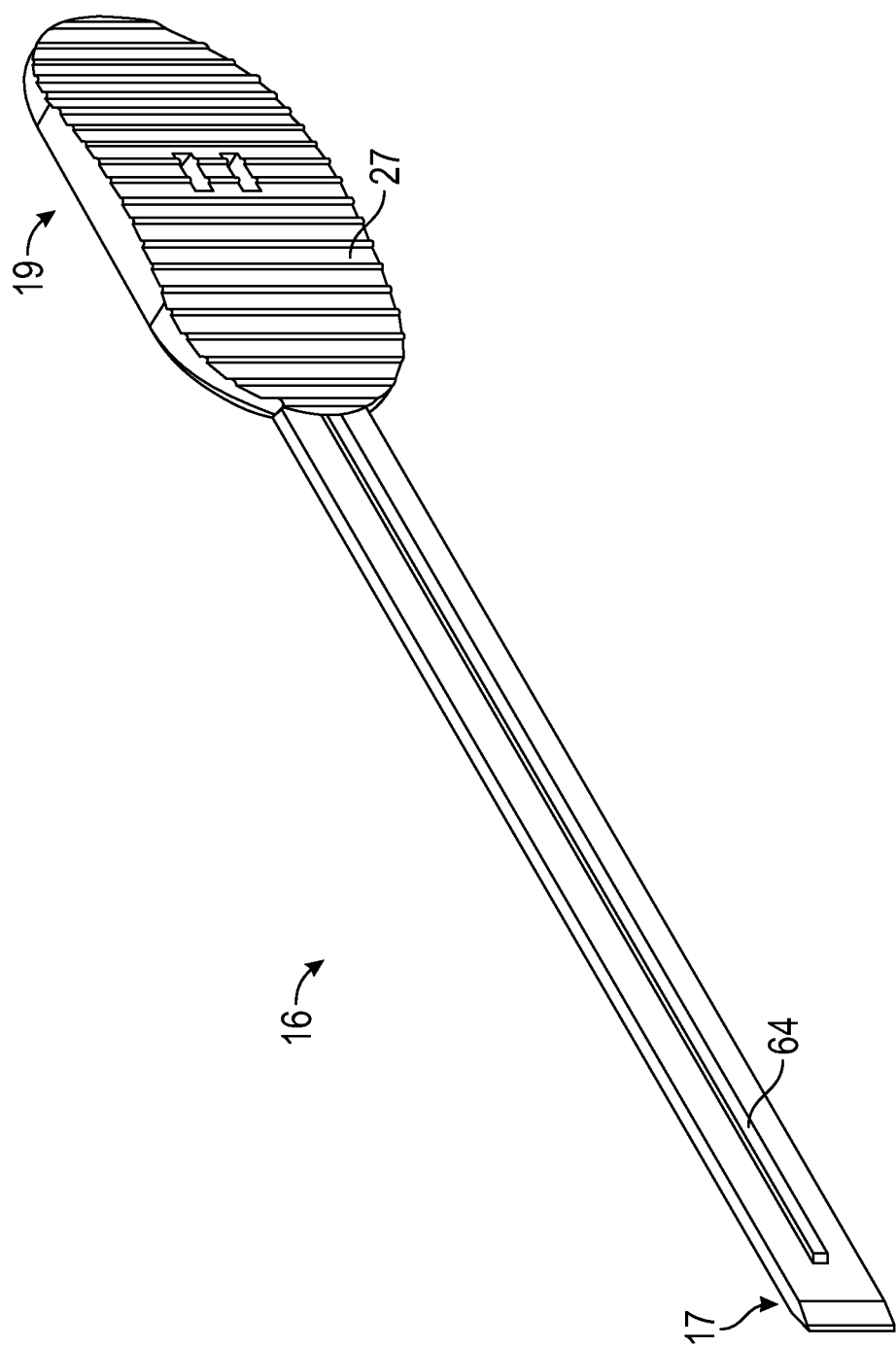
FIGS. 8-9 are side perspective views of a locking member of the connector assembly of FIG. 1.
Figure 9:
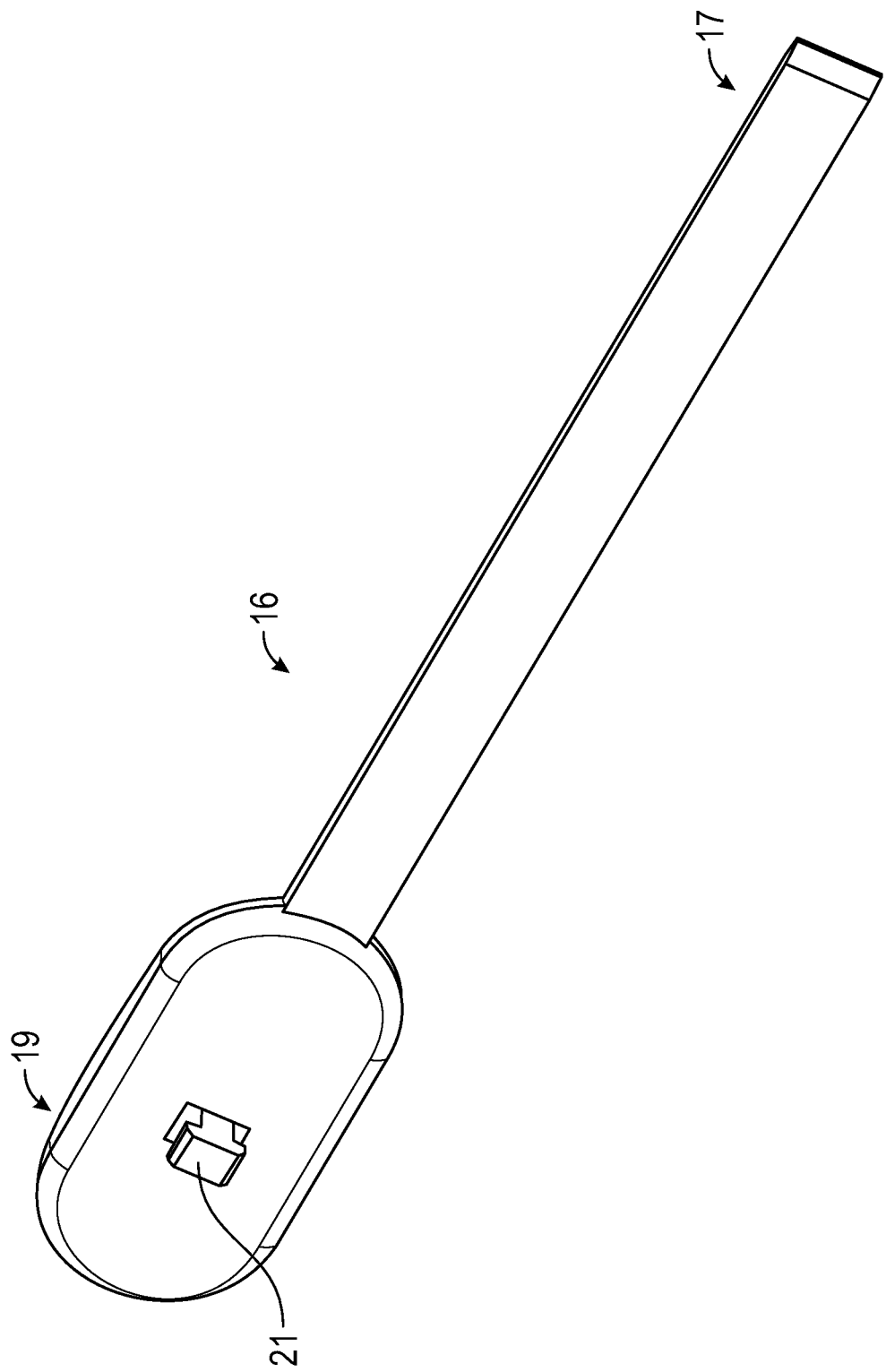

As shown in FIGS. 3 and 7, exemplary first outer wall 44 includes a receiving area 50 (e.g., receiving recess 50) for locking member 16. Receiving area 50 includes an aperture 52 that is configured and dimensioned to allow the distal end 17 (FIGS. 8-9) of locking member 16 to be inserted therethrough.

Receiving area 50 also includes a mounting area 54 that is configured and dimensioned to allow the locking member 16 (e.g., the proximal end 19 of locking member 16) to be releasably mounted thereto. Exemplary mounting area 54 includes an enlarged aperture 56 configured to allow the mounting member 21 (e.g., T-shaped mounting member 21) of locking member 16 to pass therethrough.

After the distal end 17 of locking member 16 is inserted through aperture 52, and after the mounting member 21 is inserted through enlarged aperture 56, the locking member 16 can be moved backwards (e.g., via handle area 27) in the direction of Arrow B (FIGS. 1, 4, 5 and 7) to position the locking member 16 in the unlocked position (as shown in FIGS. 1, 4, 5, 7, 13 and 15), with the mounting member 21 (e.g., T-shaped mounting member 21) positioned over one or more rear protruding members 58 (e.g., over two rear protruding members 58) of mounting area 54 as shown in FIG. 7. In such a position as shown in FIG. 7, the locking member 16 is in the unlocked position, and cannot travel further in the direction of Arrow B.

The locking member 16 can then be moved forwards (e.g., via handle area 27) in the direction of Arrow F (FIGS. 1, 6 and 7) to position the locking member 16 in the locked position (as shown in FIGS. 2, 6, 14, 16 and 17), with the mounting member 21 (e.g., T-shaped mounting member 21) positioned over one or more forward protruding members 60 (e.g., over two forward protruding members 60) of mounting area 54 as depicted in FIG. 7. In such a position, the locking member 16 is in the locked position, and cannot travel further in the direction of Arrow F (when member 21 is over members 60 in the forward position).

In certain embodiments and as shown in FIGS. 3, 7, 8, 13, 14 and 17, the inner surface 45 of first outer wall 44 (and the inner surface of the second outer wall 46) includes a groove 62 that extends from the aperture 52 to the first end 24, the groove 62 configured and dimensioned to house an extending member 64 of locking member 16 (FIG. 8), to facilitate locking member 16 travelling forward (in the direction of Arrow F) or backward (in the direction of Arrow B) relative to and releasably within housing 22. Exemplary extending member 64 extends from handle area 27 to a position proximal to distal end 17 of locking member 16.

In exemplary embodiments, it is noted that second outer wall 46 also includes a similar receiving area 50 and a similar mounting area 54 for another locking member 16 for second outer wall 46.

As shown in FIGS. 7 and 10-12, exemplary first rear side wall 32 includes an open area 65 configured to receive and provide room for the receiving recess 50 (with locking member 16 mounted thereto) of first outer wall 44 of cover member 42, when cover member 42 is releasably mounted with respect to first rear side wall 32 and/or base wall 30.

First rear side wall 32 also includes a channel 67 that extends from the open area 65 to the first end 24, the channel 68 configured and dimensioned to at least partially house the locking member 16 therein during the forward and backward motion of the locking member 16, and during the locked and unlocked positioning of the locking member 16. As such, the channel 67 is configured and dimensioned to house at least a portion of the locking member 16 (FIG. 12), to facilitate locking member 16 travelling forward (in the direction of Arrow F) or backward (in the direction of Arrow B) relative to and releasably within housing 22.

In exemplary embodiments, it is noted that second rear side wall 34 also includes a similar open area 65 and a similar channel 67 for another locking member 16 for second rear side wall 34.

In general and as shown in FIGS. 10-14, an engagement member 70 (e.g., a snap-hook engagement member 70) extends from the mounting flange 28 at the first side 23 and at the first end 24. In exemplary embodiments, the engagement member 70 is an extension of at least a portion of first rear side wall 32 that extends past mounting flange 28 towards first end 24. As such, engagement member 70 can include channel 67 for at least partially housing locking member 16 as discussed above. Exemplary engagement member 70 includes an extending portion 72 for engaging bezel member 18, as discussed further below.

In exemplary embodiments, it is noted that another engagement member 70 can extend from the mounting flange 28 at second side 25 and at first end 24. This engagement member 70 can be an extension of at least a portion of second rear side wall 34, and can include a channel 67 and an extending portion 72.

With reference to FIGS. 1-6, bezel member 18 is configured and dimensioned to be releasably mounted to panel member 12, and relative to an aperture 13 of panel member 12.

Exemplary bezel member 18 extends from a first end 29 to a second end 31. Proximal to each end 29, 31 is an opening 33 positioned for receipt of a respective fastener member 35.

As shown in FIGS. 1-3, bezel member 18 can be releasably mounted to panel member 12 by lining up openings 33 of bezel member 18 with openings 37 of panel member 12, and then mounting or securing fastener members 35 through respective openings 33, 37. It is noted that fastener members 35 can be positioned in openings 33 of bezel member 18, and then bezel member 18 can be mounted to openings 37 of panel member 12. Bezel member 18 also includes a plurality of receipt apertures 39 configured to receive and/or at least partially house respective ports/adapters 20 of connector assembly 14.

Proximal to each end 29, 31 (and proximal to each opening 33) is a slot 47 positioned for receipt of at least a portion of a respective engagement member 70 (e.g., the extending portion 72 of engagement member 70), and for receipt of at least a portion of a respective distal end 17 of a locking member 16 (when locking member 16 is in the locked position).

After the bezel member 18 is releasably mounted to the panel member 12, the assembled connector assembly 14, 14' can be mounted with respect to the panel member 12 from the rear side 49 of the panel member 12. As such and after mounting the connector assembly 14 with respect to the panel member 12 via the bezel member 18 mounted to the panel member 12, the front surface of the mounting flange 28 is proximal to the rear side 49 of the panel member 12, and the rear surface of the bezel member 18 is mounted proximal to front panel surface 15 of panel member 12.

As such, the present disclosure provides advantageous connector assemblies 14, 14' having a detachable front bezel member 18 that allows the connector assemblies 14, 14' to be assembled, terminated and/or mounted with respect to a panel member 12 from the rear 49 of the panel member 12, thereby providing user-friendly access for the splicing and management/storage of media cables (e.g., optical fiber cables) associated with the connector assemblies 14, 14'. For example and in certain embodiments, the present disclosure provides for a connector assembly 14 having one or more locking members 16, with each locking member 16 configured to releasably secure the connector assembly 14 to a bezel member 18 mounted to a panel member 12.

As noted, after the bezel member 18 is releasably mounted to the panel member 12, the assembled connector assembly 14, 14' can be mounted with respect to the panel member 12 from the rear side 49 of the panel member 12. The connector assembly 14 can be moved in the direction of Arrow F so that receipt apertures 39 of bezel member 18 receive and/or at least partially house respective ports/adapters 20 of connector assembly 14, and so that each slot 47 of bezel member 18 receives and/or at least partially houses at least a portion of a respective engagement member 70 (e.g., the extending portion 72 of engagement member 70).

In exemplary embodiments and in the unlocked position of the locking member, after the connector assembly 14 is mounted with respect to the panel member 12 via the bezel member 18 mounted to the panel member 12, the ports/adapters 20 extend through respective apertures 39, and the extending portions 72 of engagement members 70 extend through respective slots 47. As noted, in such a position, the connector assembly 14 is mounted with respect to the panel member 12 via the bezel member 18 mounted to the panel member 12, and the locking member 16 is in the unlocked position (the unlocked position of the locking member 16 is shown in FIGS. 1, 4, 5, 7, 13 and 15).

Thereafter, the locking member 16 can then be moved forwards (e.g., via handle area 27) in the direction of Arrow F (FIGS. 1, 6 and 7) to position the locking member 16 in the locked position (as shown in FIGS. 2, 6, 14, 16 and 17). This thereby positions at least a portion of the distal end 17 of the locking member 16 through a respective slot 47, which thereby forces a respective extending portion 72 of an engagement member 70 into locking engagement with the bezel member 18 (e.g, extending portion 72 is lockingly engages against a front surface of bezel member 18), as depicted in FIGS. 2, 6, 14, 16 and 17.

Thereafter, a user can re-position the locking member 16 in the unlocked position by moving the locking member 16 backwards (e.g., via handle area 27) in the direction of Arrow B (FIGS. 1, 4, 5 and 7) to position the locking member 16 in the unlocked position (as shown in FIGS. 1, 4, 5, 7, 13 and 15). After such movement and if desired, the connector assembly 14 can be removed from the bezel member 18 by removing the engagement members 70 from the slots 47 and moving the assembly 14 backwards in the direction of Arrow B.

In other embodiments, it is noted that each locking mechanism 16 could wrap around a curve (e.g., third rear side wall 36), or be actuated (e.g., moved in direction of Arrows F and B) from the top or bottom of the housing 22.

In further embodiments, it is noted that mounting flange 28 may not include engagement members 70. In such embodiments, the bezel member 18 can include an engagement member or the like (e.g., similar to engagement member 70) that extends from the rear side of the bezel member 18, and can engage the housing 22 (e.g., can engage a slot or surface of mounting flange 28) similar to the engagement described for engagement member 70.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A connector assembly comprising:
   a housing that extends from a first end to a second end, the housing including a base wall, with a first rear side wall, a second rear side wall and a third rear side wall extending from the base wall;
   a mounting flange extending from the base wall and positioned proximal to the first end of the housing, the mounting flange housing at least a portion of one or more ports;
   a first locking member mounted with respect to the first rear side wall;
   a bezel member extending from a first end to a second end, the bezel member having one or more receipt apertures; and
   a panel member having a front panel surface and a rear side, the panel member including an aperture;
   wherein after mounting the bezel member to the front panel surface and with respect to the aperture of the panel member, and after mounting the housing with respect to the rear side of the panel member and with respect to the aperture of the panel member so that at least a portion of the one or more ports are positioned within the one or more receipt apertures of the bezel member, the first locking member is configured to be moved from an unlocked position to a locked position to lockingly engage the housing, the bezel member and the panel member with respect to one another.

2. The assembly of claim 1, wherein the housing is a splice cassette housing, and the panel member is a patch panel member or a multi-connector panel member; and
   wherein the one or more ports are fiber optic ports for mating with fiber optic connectors.

3. The assembly of claim 1, wherein the mounting flange and the first, second and third rear side walls extend orthogonally from the base wall.

4. The assembly of claim 1, wherein the mounting flange and the first, second and third rear side walls form a substantially continuous wall structure that extends around the base wall and defines a receiving cavity therein.

5. The assembly of claim 1, wherein the bezel member includes a slot positioned proximal to the first end of the bezel member; and
   wherein when the first locking member is moved from the unlocked position to the locked position, at least a portion of the first locking member is positioned within the slot of the bezel member to lockingly engage the housing, the bezel member and the panel member with respect to one another.

6. The assembly of claim 5, wherein an engagement member extends from the mounting flange; and
   wherein after mounting the housing with respect to the rear side of the panel member and with respect to the aperture of the panel member so that at least a portion of the one or more ports are positioned within the one or more receipt apertures of the bezel member, at least a portion of the engagement member is positioned within the slot of the bezel member.

7. The assembly of claim 6, wherein when the first locking member is moved from the unlocked position to the locked position, at least a portion of the engagement member and at least a portion of the first locking member are both positioned within the slot of the bezel member to lockingly engage the housing, the bezel member and the panel member with respect to one another.

8. The assembly of claim 6, wherein the engagement member is an extension of at least a portion of the first rear side wall.

9. The assembly of claim 1 further comprising a second locking member mounted with respect to the second rear side wall;
wherein after mounting the bezel member to the front panel surface and with respect to the aperture of the panel member, and after mounting the housing with respect to the rear side of the panel member and with respect to the aperture of the panel member so that at least a portion of the one or more ports are positioned within the one or more receipt apertures of the bezel member, the first and second locking members are configured to be moved from an unlocked position to a locked position to lockingly engage the housing, the bezel member and the panel member with respect to one another.

10. The assembly of claim 1 further comprising a cover member releasably mounted to the housing, the cover member including a top wall, with a first outer wall, a second outer wall and a third outer wall extending from the top wall;
wherein after releasably mounting the cover member to the housing, the first outer wall is substantially positioned around and over first rear side wall, and the second outer wall is substantially positioned around and over second rear side wall, and the third outer wall is substantially positioned around and over third rear side wall.

11. The assembly of claim 10, wherein the first locking member is mounted with respect to the first outer wall.

12. The assembly of claim 11, wherein the first outer wall includes a mounting area that is configured to allow the first locking member to be releasably mounted, the mounting area including an enlarged aperture configured to allow a mounting member of the first locking member to pass through for mounting.

13. The assembly of claim 1, wherein the first rear side wall includes a channel, the channel configured to at least partially house the first locking member therein.

14. The assembly of claim 1, wherein after the first locking member is moved from the unlocked position to the locked position, the first locking member is configured to be moved from the locked position to the unlocked position to allow for the disengagement of the housing, the bezel member and the panel member from one another.

15. The assembly of claim 1, wherein the panel member is configured to be mounted with respect to a media patching system, and the media patching system is configured to be mounted with respect to a supporting structure.

16. A method for utilizing a connector assembly comprising:
providing a housing that extends from a first end to a second end, the housing including a base wall, with a first rear side wall, a second rear side wall and a third rear side wall extending from the base wall;
providing a mounting flange extending from the base wall and positioned proximal to the first end of the housing, the mounting flange housing at least a portion of one or more ports;
mounting a first locking member with respect to the first rear side wall;
providing a bezel member extending from a first end to a second end, the bezel member having one or more receipt apertures; and
providing a panel member having a front panel surface and a rear side, the panel member including an aperture;
mounting the bezel member to the front panel surface and with respect to the aperture of the panel member;
mounting the housing with respect to the rear side of the panel member and with respect to the aperture of the panel member so that at least a portion of the one or more ports are positioned within the one or more receipt apertures of the bezel member; and
moving the first locking member from an unlocked position to a locked position to lockingly engage the housing, the bezel member and the panel member with respect to one another.

17. The method of claim 16, wherein the housing is a splice cassette housing, and the panel member is a patch panel member or a multi-connector panel member;
wherein the one or more ports are fiber optic ports for mating with fiber optic connectors;
wherein the mounting flange and the first, second and third rear side walls extend orthogonally from the base wall; and
wherein the mounting flange and the first, second and third rear side walls form a substantially continuous wall structure that extends around the base wall and defines a receiving cavity therein.

18. The method of claim 16, wherein the bezel member includes a slot positioned proximal to the first end of the bezel member; and
wherein when the first locking member is moved from the unlocked position to the locked position, at least a portion of the first locking member is positioned within the slot of the bezel member to lockingly engage the housing, the bezel member and the panel member with respect to one another.

19. The method of claim 16 further comprising a second locking member mounted with respect to the second rear side wall;
wherein after mounting the bezel member to the front panel surface and with respect to the aperture of the panel member, and after mounting the housing with respect to the rear side of the panel member and with respect to the aperture of the panel member so that at least a portion of the one or more ports are positioned within the one or more receipt apertures of the bezel member, the first and second locking members are moved from the unlocked position to the locked position to lockingly engage the housing, the bezel member and the panel member with respect to one another.

20. A connector assembly comprising:
a housing that extends from a first end to a second end, the housing including a base wall, with a first rear side wall, a second rear side wall and a third rear side wall extending from the base wall;
a mounting flange extending from the base wall and positioned proximal to the first end of the housing, the mounting flange housing at least a portion of one or more ports;
a cover member releasably mounted to the housing, the cover member including a top wall, with a first outer wall, a second outer wall and a third outer wall extending from the top wall;

a first locking member mounted with respect to the first rear side wall and with respect to the first outer wall;

a second locking member mounted with respect to the second rear side wall and with respect to the second outer wall;

a bezel member extending from a first end to a second end, the bezel member having one or more receipt apertures; and a panel member having a front panel surface and a rear side, the panel member including an aperture;

wherein after releasably mounting the cover member to the housing, the first outer wall is substantially positioned around and over first rear side wall, and the second outer wall is substantially positioned around and over second rear side wall, and the third outer wall is substantially positioned around and over third rear side wall;

wherein after mounting the bezel member to the front panel surface and with respect to the aperture of the panel member, and after mounting the housing with respect to the rear side of the panel member and with respect to the aperture of the panel member so that at least a portion of the one or more ports are positioned within the one or more receipt apertures of the bezel member, the first and second locking members are configured to be moved from an unlocked position to a locked position to lockingly engage the housing, the bezel member and the panel member with respect to one another.

* * * * *